(12) United States Patent
Wang et al.

(10) Patent No.: US 12,079,436 B2
(45) Date of Patent: Sep. 3, 2024

(54) TOUCH CONTROL STRUCTURE, DISPLAY PANEL, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Wei Wang, Beijing (CN); Yi Zhang, Beijing (CN); Yuanqi Zhang, Beijing (CN); Yu Wang, Beijing (CN); Yang Zeng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/467,738

(22) Filed: Sep. 15, 2023

(65) Prior Publication Data
US 2024/0004507 A1 Jan. 4, 2024

Related U.S. Application Data

(63) Continuation of application No. 17/299,299, filed as application No. PCT/CN2020/107293 on Aug. 6, 2020, now Pat. No. 11,797,138.

(51) Int. Cl.
*G06F 3/044* (2006.01)

(52) U.S. Cl.
CPC .......... *G06F 3/0446* (2019.05); *G06F 3/0445* (2019.05); *G06F 2203/04111* (2013.01); *G06F 2203/04112* (2013.01)

(58) Field of Classification Search
CPC .... G06F 3/0446; G06F 3/0448; G06F 3/0412; G06F 3/0445; G06F 3/0443;
(Continued)

(56) References Cited

U.S. PATENT DOCUMENTS

2013/0194213 A1* 8/2013 Chou .................... G06F 3/0445
345/173
2015/0185893 A1 7/2015 Wu et al.
(Continued)

FOREIGN PATENT DOCUMENTS

CN 102915155 A 2/2013
CN 203720820 U 7/2014
(Continued)

OTHER PUBLICATIONS

International Search Report & Written Opinion mailed Apr. 25, 2021, regarding PCT/CN2020/107293.
(Continued)

*Primary Examiner* — Deeprose Subedi
(74) *Attorney, Agent, or Firm* — Intellectual Valley Law, P.C.

(57) ABSTRACT

A touch control structure is provided. The touch control structure includes a plurality of first touch electrodes arranged in a plurality of rows and a plurality of second touch electrodes arranged in a plurality of columns, forming a plurality of bridge intersections and a plurality of non-bridge intersections. The touch control structure at a respective one of the plurality of bridge intersections includes a respective one of a plurality of first bridges connecting two adjacent first touch electrode blocks in a respective row and a respective one of a plurality of second bridges connecting two adjacent second touch electrode blocks in a respective column. The touch control structure at a respective one of the plurality of non-bridge intersections includes a respective one of a plurality of intersection fill patterns spaced apart from the first touch electrode blocks and the second touch electrode blocks.

13 Claims, 29 Drawing Sheets

(58) Field of Classification Search
CPC .. G06F 2203/04111; G06F 2203/04112; G06F 2203/04103
See application file for complete search history.

(56) References Cited

U.S. PATENT DOCUMENTS

| | | |
|---|---|---|
| 2019/0004638 A1 | 1/2019 | Lee et al. |
| 2020/0026376 A1 | 1/2020 | Lee et al. |
| 2020/0103994 A1 | 4/2020 | Vaze |

FOREIGN PATENT DOCUMENTS

| | | |
|---|---|---|
| CN | 205507728 U | 8/2016 |
| CN | 109213365 A | 1/2019 |
| CN | 110209299 A | 9/2019 |
| CN | 110737349 A | 1/2020 |
| CN | 209911950 U | 1/2020 |
| CN | 111475051 A | 7/2020 |

OTHER PUBLICATIONS

First Office Action in the Chinese Patent Application No. 202080001455.9, dated Jun. 30, 2023; English translation attached.

Non-Final Office Action in the U.S. Appl. No. 17/299,299, dated May 4, 2023.

Response to Non-Final Office Action in the U.S. Appl. No. 17/299,299, dated Jun. 25, 2023.

Notice of Allowance in the U.S. Appl. No. 17/299,299, dated Jul. 17, 2023.

\* cited by examiner

TOUCH CONTROL STRUCTURE, DISPLAY PANEL, AND DISPLAY APPARATUS

CROSS-REFERENCE TO RELATED APPLICATION

This application is a continuation of U.S. application Ser. No. 17/299,299, filed Aug. 6, 2020, which is a national stage application under 35 U.S.C. § 371 of International Application No. PCT/CN2020/107293, filed Aug. 6, 2020. Each of the forgoing applications is herein incorporated by reference in its entirety for all purposes.

TECHNICAL FIELD

The present invention relates to display technology, more particularly, to a touch control structure, a display panel, and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control structure, comprising a plurality of first touch electrodes arranged in a plurality of rows and a plurality of second touch electrodes arranged in a plurality of columns; first touch electrode blocks of the plurality of rows and second touch electrode blocks of the plurality of columns are respectively arranged in interlaced matrices, forming a plurality of bridge intersections and a plurality of non-bridge intersections; the touch control structure at a respective one of the plurality of bridge intersections comprises a respective one of a plurality of first bridges connecting two adjacent first touch electrode blocks in a respective row and a respective one of a plurality of second bridges connecting two adjacent second touch electrode blocks in a respective column; and the touch control structure at a respective one of the plurality of non-bridge intersections comprises a respective one of a plurality of intersection fill patterns spaced apart from the first touch electrode blocks and the second touch electrode blocks; wherein the respective one of the plurality of intersection fill patterns is in a space surrounded by a first portion, a second portion, a third portion, and a fourth portion; the first portion and the second portion are respectively from the first touch electrode blocks respectively from two adjacent rows of the plurality of rows; the third portion and the fourth portion are respectively from the two second touch electrode blocks respectively from two adjacent columns of the plurality of columns; an entirety of a periphery of the respective one of the plurality of intersection fill patterns is surrounded by respective portions of a first side of the first portion, a second side of the second portion, a third side of the third portion, and a fourth side of a fourth portion; and the first touch electrode blocks, the second touch electrode blocks, and the plurality of intersection fill patterns are in a same layer and made of a same material.

Optionally, the respective one of the plurality of intersection fill patterns is in a space surrounded by two first touch electrode blocks respectively from two adjacent rows of the plurality of rows and two second touch electrode blocks respectively from two adjacent columns of the plurality of columns.

Optionally, the two first touch electrode blocks respectively from the two adjacent rows are spaced apart from each other by the respective one of the plurality of intersection fill patterns; and the two second touch electrode blocks respectively from the two adjacent columns are spaced apart from each other by the respective one of the plurality of intersection fill patterns.

Optionally, a first virtual center line of the two first touch electrode blocks respectively from the two adjacent rows crosses over the respective one of the plurality of intersection fill patterns; and a second virtual center line of the two second touch electrode blocks respectively from the two adjacent columns of the plurality of columns crosses over the respective one of the plurality of intersection fill patterns.

Optionally, the first portion is respectively spaced apart from the second portion, the third portion, and the fourth portion by the respective one of the plurality of intersection fill patterns; the second portion is respectively spaced apart from the first portion, the third portion, and the fourth portion by the respective one of the plurality of intersection fill patterns; the third portion is respectively spaced apart from the first portion, the second portion, and the fourth portion by the respective one of the plurality of intersection fill patterns; and the fourth portion is respectively spaced apart from the first portion, the second portion, and the third portion by the respective one of the plurality of intersection fill patterns.

Optionally, the first side and the second side are substantially parallel to each other; and the third side and the fourth side are substantially parallel to each other.

Optionally, electrode blocks of the plurality of first touch electrodes and the plurality of second touch electrodes are respectively mesh electrode blocks; the plurality of intersection fill patterns are mesh patterns; a respective first electrode block and a respective second electrode block adjacent to each other are insulated from each other by line breaks in mesh lines of the mesh electrode blocks; the first side, the second side, the third side, and the fourth side, are respectively formed by virtually connected line breaks respectively of the first portion, the second portion, the third portion, and the fourth portion; the periphery of the respective one of the plurality of intersection fill patterns is insulated from the first portion, the second portion, the third portion, and the fourth portion by line breaks in the mesh lines of the mesh patterns; and the periphery of the respective one of the plurality of intersection fill patterns is formed by the line breaks in the mesh lines of the mesh patterns.

Optionally, each of the first portion, the second portion, the third portion, and the fourth portion comprises a respective protrusion adjacent to the respective one of the plurality of intersection fill patterns; wherein the respective protrusion comprises a first branch and a second branch; the first branch extends along a first direction; the second branch extends along a second direction; and the first direction and the second direction are substantially perpendicular to each other.

Optionally, a respective second block of the second touch electrode blocks comprises two second bridge protrusions along a column direction and two second non-bridge protrusions along a row direction; the two second bridge protrusions are respectively connected to two adjacent second touch electrode blocks respectively through two adjacent bridge intersections of the plurality of bridge intersections along the column direction; and the two second non-bridge protrusions are respectively directly adjacent to two adjacent fill patterns of the plurality of intersection fill patterns respectively at two adjacent non-bridge intersections of the plurality of non-bridge intersections along the row direction.

Optionally, a ratio between a first total surface area of the plurality of intersection fill patterns and a second total combined surface area of the first touch electrode blocks, the second touch electrode blocks, and the plurality of intersection fill patterns is greater than zero and no more than 1%.

Optionally, the touch control structure further comprises a plurality of touch electrode bridges and an insulating layer between the plurality of touch electrode bridges, and the electrode blocks of the plurality of first touch electrodes and the plurality of second touch electrodes; wherein the plurality of touch electrode bridges respectively extend through vias in the insulating layer to respectively connect adjacent second electrode blocks in a respective column of the plurality of columns of the plurality of second touch electrodes.

Optionally, the touch control structure further comprises a plurality of internal fill patterns respectively surrounded by electrode blocks of the plurality of second touch electrodes; wherein the plurality of internal fill patterns are absent in the plurality of first touch electrodes.

In another aspect, the present disclosure provides a display apparatus, comprising the display panel described herein or fabricated by a method described herein, and an integrated circuit connected to the display panel.

In another aspect, the present disclosure provides a touch control structure, comprising a plurality of first touch electrodes arranged in a plurality of rows and a plurality of second touch electrodes arranged in a plurality of columns; first touch electrode blocks of the plurality of rows and second touch electrode blocks of the plurality of columns are respectively arranged in interlaced matrices, forming a plurality of bridge intersections and a plurality of non-bridge intersections; the touch control structure at a respective one of the plurality of bridge intersections comprises a respective one of a plurality of first bridges connecting two adjacent first touch electrode blocks in a respective row and a respective one of a plurality of second bridges connecting two adjacent second touch electrode blocks in a respective column; and the touch control structure at a respective one of the plurality of non-bridge intersections comprises a respective one of a plurality of intersection fill patterns spaced apart from the first touch electrode blocks and the second touch electrode blocks.

Optionally, the respective one of the plurality of intersection fill patterns is in a space surrounded by two first touch electrode blocks respectively from two adjacent rows of the plurality of rows and two second touch electrode blocks respectively from two adjacent columns of the plurality of columns.

Optionally, the two first touch electrode blocks respectively from the two adjacent rows are spaced apart from each other by the respective one of the plurality of intersection fill patterns; and the two second touch electrode blocks respectively from the two adjacent columns are spaced apart from each other by the respective one of the plurality of intersection fill patterns.

Optionally, a first virtual center line of the two first touch electrode blocks respectively from the two adjacent rows crosses over the respective one of the plurality of intersection fill patterns; and a second virtual center line of the two second touch electrode blocks respectively from the two adjacent columns of the plurality of columns crosses over the respective one of the plurality of intersection fill patterns.

Optionally, the respective one of the plurality of intersection fill patterns is in a space surrounded by a first portion, a second portion, a third portion, and a fourth portion; the first portion and the second portion are respectively from the first touch electrode blocks respectively from two adjacent rows of the plurality of rows; the third portion and the fourth portion are respectively from the two second touch electrode blocks respectively from two adjacent columns of the plurality of columns; the first portion is respectively spaced apart from the second portion, the third portion, and the fourth portion by the respective one of the plurality of intersection fill patterns; the second portion is respectively spaced apart from the first portion, the third portion, and the fourth portion by the respective one of the plurality of intersection fill patterns; the third portion is respectively spaced apart from the first portion, the second portion, and the fourth portion by the respective one of the plurality of intersection fill patterns; and the fourth portion is respectively spaced apart from the first portion, the second portion, and the third portion by the respective one of the plurality of intersection fill patterns.

Optionally, an entirety of a periphery of the respective one of the plurality of intersection fill patterns is surrounded by respective portions of a first side of the first portion, a second side of the second portion, a third side of the third portion, and a fourth side of a fourth portion; the first side and the second side are substantially parallel to each other; and the third side and the fourth side are substantially parallel to each other.

Optionally, electrode blocks of the plurality of first touch electrodes and the plurality of second touch electrodes are respectively mesh electrode blocks; the plurality of intersection fill patterns are mesh patterns; a respective first electrode block and a respective second electrode block adjacent to each other are insulated from each other by line breaks in mesh lines of the mesh electrode blocks; the first side, the second side, the third side, and the fourth side, are respectively formed by virtually connected line breaks respectively of the first portion, the second portion, the third portion, and the fourth portion; the periphery of the respective one of the plurality of intersection fill patterns is insulated from the first portion, the second portion, the third portion, and the fourth portion by line breaks in the mesh lines of the mesh patterns; and the periphery of the respective one of the plurality of intersection fill patterns is formed by the line breaks in the mesh lines of the mesh patterns.

Optionally, each of the first portion, the second portion, the third portion, and the fourth portion comprises a respective protrusion directly adjacent to the respective one of the plurality of intersection fill patterns.

Optionally, the respective protrusion comprises a first branch and a second branch; the first branch extends along a first direction; the second branch extends along a second direction; and the first direction and the second direction are substantially perpendicular to each other.

Optionally, a respective first block of the first touch electrode blocks comprises two first bridge protrusions along a row direction and two first non-bridge protrusions along a column direction; the two first bridge protrusions are respectively connected to two adjacent first touch electrode blocks respectively through two adjacent bridge intersections of the plurality of bridge intersections along the row direction; and the two first non-bridge protrusions are respectively directly adjacent to two adjacent fill patterns of the plurality of intersection fill patterns respectively at two adjacent non-bridge intersections of the plurality of non-bridge intersections along the column direction.

Optionally, electrode blocks of the plurality of first touch electrodes and the plurality of second touch electrodes are respectively mesh electrode blocks; fill patterns of the plurality of intersection fill patterns are mesh patterns; the electrode blocks of the plurality of first touch electrodes and the plurality of second touch electrodes, and the plurality of intersection fill patterns, are formed from a mesh layer; the touch control structure comprises gaps to respectively space apart the electrode blocks of the plurality of first touch electrodes and the plurality of second touch electrodes, and the plurality of intersection fill patterns; non-bridge protrusion and fill pattern that are directly adjacent to each other are insulated from each other by a gap having a gap width in a range of 1 μm to 10 μm; and the mesh layer has a mesh line width in a range of 1 μm to 5 μm.

Optionally, the two first non-bridge protrusions are at least partially truncated compared with the two first bridge protrusions.

Optionally, each of the two first bridge protrusions has a first number of branches; each of the two first non-bridge protrusions has a second number of branches; and the first number equals to the second number.

Optionally, each of the two first non-bridge protrusions comprises two branches; a first respective one of the plurality of intersection fill patterns is directly adjacent to two branches of a first respective one of the two first non-bridge protrusions; and a second respective one of the plurality of intersection fill patterns is directly adjacent to two branches of a second respective one of the two first non-bridge protrusions.

Optionally, a respective second block of the second touch electrode blocks comprises two second bridge protrusions along a column direction and two second non-bridge protrusions along a row direction; the two second bridge protrusions are respectively connected to two adjacent second touch electrode blocks respectively through two adjacent bridge intersections of the plurality of bridge intersections along the column direction; and the two second non-bridge protrusions are respectively directly adjacent to two adjacent fill patterns of the plurality of intersection fill patterns respectively at two adjacent non-bridge intersections of the plurality of non-bridge intersections along the row direction.

Optionally, the two second non-bridge protrusions are substantially intact compared with the two second bridge protrusions.

Optionally, the two second non-bridge protrusions are at least partially truncated compared with the two second bridge protrusions.

Optionally, each of the two second bridge protrusions has a third number of branches; each of the two second non-bridge protrusions has a fourth number of branches; and the third number equals to the fourth number.

Optionally, each of the two second non-bridge protrusions comprises two branches; a third respective one of the plurality of intersection fill patterns is directly adjacent to two branches of a third respective one of the two second non-bridge protrusions; and a fourth respective one of the plurality of intersection fill patterns is directly adjacent to two branches of a fourth respective one of the two second non-bridge protrusions.

Optionally, the respective one of the plurality of intersection fill patterns is surrounded by a first protrusion from a first row of the plurality of rows, a second protrusion from a second row of the plurality rows, a third protrusion from a first column of the plurality of columns, and a fourth protrusion from a second column of the plurality of columns; the first row and the second row are adjacent to each other; the first column and the second column are adjacent to each other; the first protrusion comprises a first branch and a second branch; the second protrusion comprises a third branch and a fourth branch; the third protrusion comprises a fifth branch and a sixth branch; the fourth protrusion comprises a seventh branch and an eighth branch; the first branch, the third branch, the fifth branch, the seventh branch respectively extend along a first direction; and the second branch, the fourth branch, the sixth branch, and the eighth branch respectively extend along a second direction.

Optionally, the respective one of the plurality of intersection fill patterns has a first pattern side, a second pattern side, a third pattern side, and a fourth pattern side; the first pattern side and the third pattern side respectively extend along the first direction; and the second pattern side and the fourth pattern side respectively extend along the second direction.

Optionally, the first pattern side is directly adjacent to the first branch and the fifth branch; the second pattern side is directly adjacent to the second branch and the eighth branch; the third pattern side is directly adjacent to the third branch and the seventh branch; and the fourth pattern side is directly adjacent to the fourth branch and the sixth branch.

Optionally, an average width of the first branch along the second direction is $1/6$ to $2/3$ of an average width of the second branch along the first direction; an average width of the third branch along the second direction is $1/6$ to $2/3$ of an average width of the fourth branch along the first direction; an average width of the sixth branch along the first direction is $1/6$ to $2/3$ of an average width of the fifth branch along the second direction; and an average width of the eighth branch along the first direction is $1/6$ to $2/3$ of an average width of the seventh branch along the second direction.

Optionally, a ratio between a first total surface area of the plurality of intersection fill patterns and a second total combined surface area of the first touch electrode blocks, the second touch electrode blocks, and the plurality of intersection fill patterns is greater than zero and no more than 1%.

Optionally, the touch control structure further comprises a plurality of touch electrode bridges and an insulating layer between the plurality of touch electrode bridges, and the electrode blocks of the plurality of first touch electrodes and the plurality of second touch electrodes; wherein the plurality of touch electrode bridges respectively extend through vias in the insulating layer to respectively connect adjacent second electrode blocks in a respective column of the plurality of columns of the plurality of second touch electrodes.

Optionally, the touch control structure further comprises a plurality of internal fill patterns respectively surrounded by electrode blocks of the plurality of second touch electrodes; wherein the plurality of internal fill patterns are absent in the plurality of first touch electrodes.

In another aspect, the present disclosure provides a display panel, comprising the touch control structure described herein or fabricated by a method described herein, and a plurality of display elements.

In another aspect, the present disclosure provides a display apparatus, comprising the display panel described herein or fabricated by a method described herein, and an integrated circuit connected to the display panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure, a display panel, and a display apparatus that substantially obviate one or more of the problems due to limitations and disadvantages of the related art. In one aspect, the present disclosure provides a touch control structure. In some embodiments, the touch control structure includes a plurality of first touch electrodes arranged in a plurality of rows and a plurality of second touch electrodes arranged in a plurality of columns. In some embodiments, first touch electrode blocks of the plurality of rows and second touch electrode blocks of the plurality of columns are respectively arranged in interlaced matrices, forming a plurality of bridge intersections and a plurality of non-bridge intersections. Optionally, the touch control structure at a respective one of the plurality of bridge intersections includes a respective one of a plurality of first bridges connecting two adjacent first touch electrode blocks in a respective row and a respective one of a plurality of second bridges connecting two adjacent second touch electrode blocks in a respective column. Optionally, the touch control structure at a respective one of the plurality of non-bridge intersections comprises a respective one of a plurality of intersection fill patterns spaced apart from the first touch electrode blocks and the second touch electrode blocks.

Figure 1:
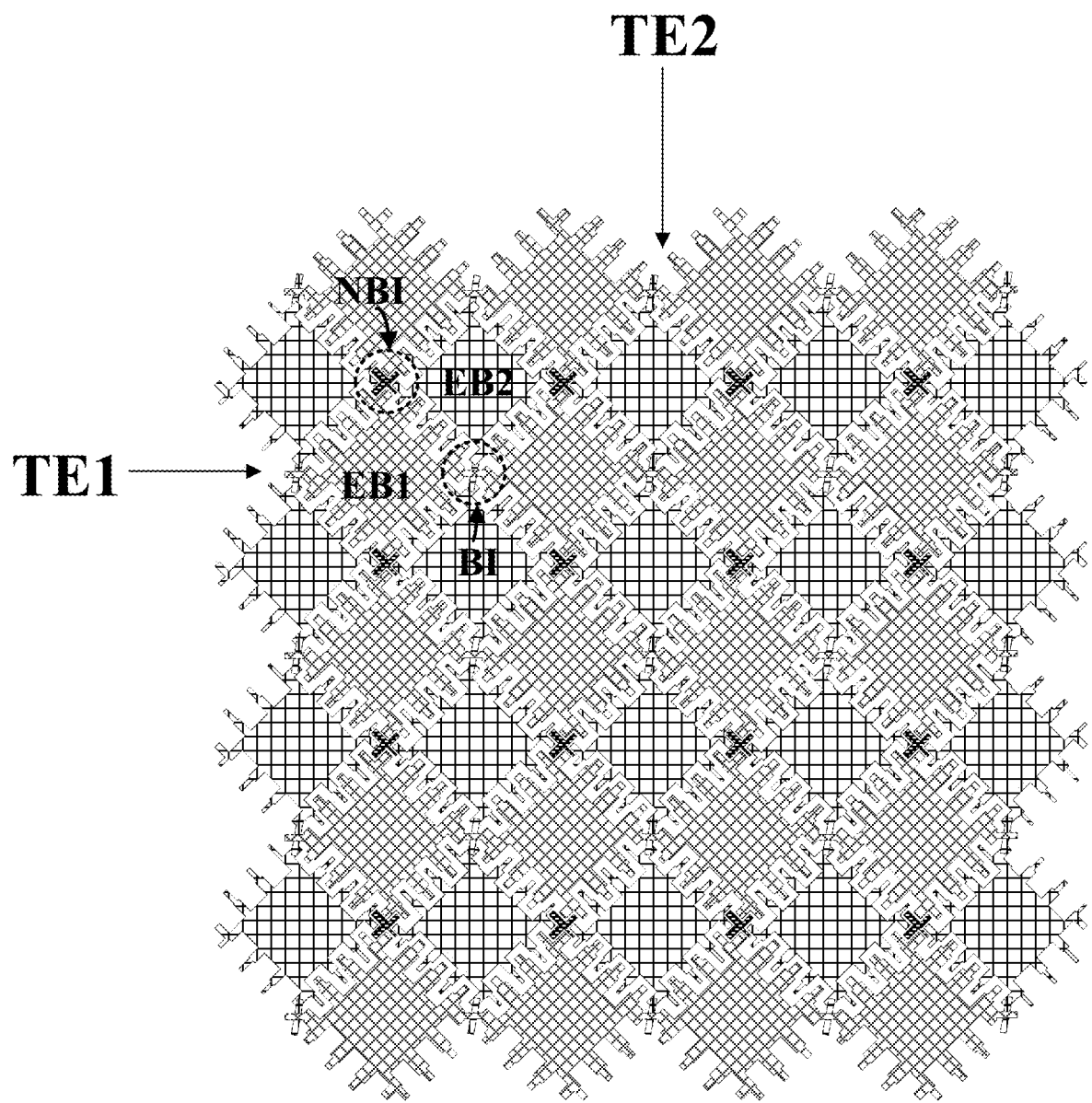
FIG. 1 is a schematic diagram illustrating the structure of a touch control structure in some embodiments according to the present disclosure.

FIG. 1 is a schematic diagram illustrating the structure of a touch control structure in some embodiments according to the present disclosure. Referring to FIG. 1, the touch control structure in some embodiments includes a plurality of first touch electrodes TE1 and a plurality of second touch electrodes TE2. The plurality of first touch electrodes TE1 are arranged in a plurality of rows, each of the plurality of rows is a respective one of the plurality of first touch electrodes TE1 Adjacent rows of the plurality of rows are isolated from each other. The plurality of second touch electrodes TE2 arranged in a plurality of columns, each of the plurality of columns is a respective one of the plurality of second touch electrodes TE2. Adjacent columns of the plurality of columns are isolated from each other. Optionally, the touch control structure is a mutual capacitance type touch control structure. Optionally, the plurality of first touch electrodes TE1 are a plurality of touch scanning electrodes, and the plurality of second touch electrodes TE2 are a plurality of touch sensing electrodes. Optionally, the plurality of first touch electrodes TE1 are a plurality of touch sensing electrodes, and the plurality of second touch electrodes TE2 are a plurality of touch scanning electrodes.

Referring to FIG. 1, the plurality of first touch electrodes TE1 includes first touch electrode blocks EB1, and the plurality of second touch electrodes TE2 includes second touch electrode blocks EB2. A respective row of the plurality of rows of the plurality of first touch electrodes TE1 includes a row of first electrode blocks of the first touch electrode blocks EB1 electrically connected together along the respective row. A respective column of the plurality of columns of the plurality of second touch electrodes TE2 includes a column of second electrode blocks of the second touch electrode blocks EB2 electrically connected together along the respective column.

Optionally, the first touch electrode blocks EB1 and the second touch electrode blocks EB2 are mesh electrode blocks comprising mesh lines.

In some embodiments, first touch electrode blocks EB1 of the plurality of rows and second touch electrode blocks EB2 of the plurality of columns are respectively arranged in interlaced matrices, forming a plurality of bridge intersections BI and a plurality of non-bridge intersections NBI. The touch control structure at a respective one of the plurality of bridge intersections BI includes a respective one of a plurality of first bridges connecting two adjacent first touch electrode blocks in a respective row and a respective one of a plurality of second bridges connecting two adjacent second touch electrode blocks in a respective column.

As shown in FIG. 1, the plurality of bridge intersections BI and the plurality of non-bridge intersections NBI are arranged in interlaced matrices. Two adjacent rows of the plurality of bridge intersections BI are spaced apart by a row of the plurality of non-bridge intersections NBI; two adjacent rows of the plurality of non-bridge intersections NBI are spaced apart by a row of the plurality of bridge intersections BI. Two adjacent columns of the plurality of bridge intersections BI are spaced apart by a column of the plurality of non-bridge intersections NBI; two adjacent columns of the plurality of non-bridge intersections NBI are spaced apart by a column of the plurality of bridge intersections BI.

Figure 2:
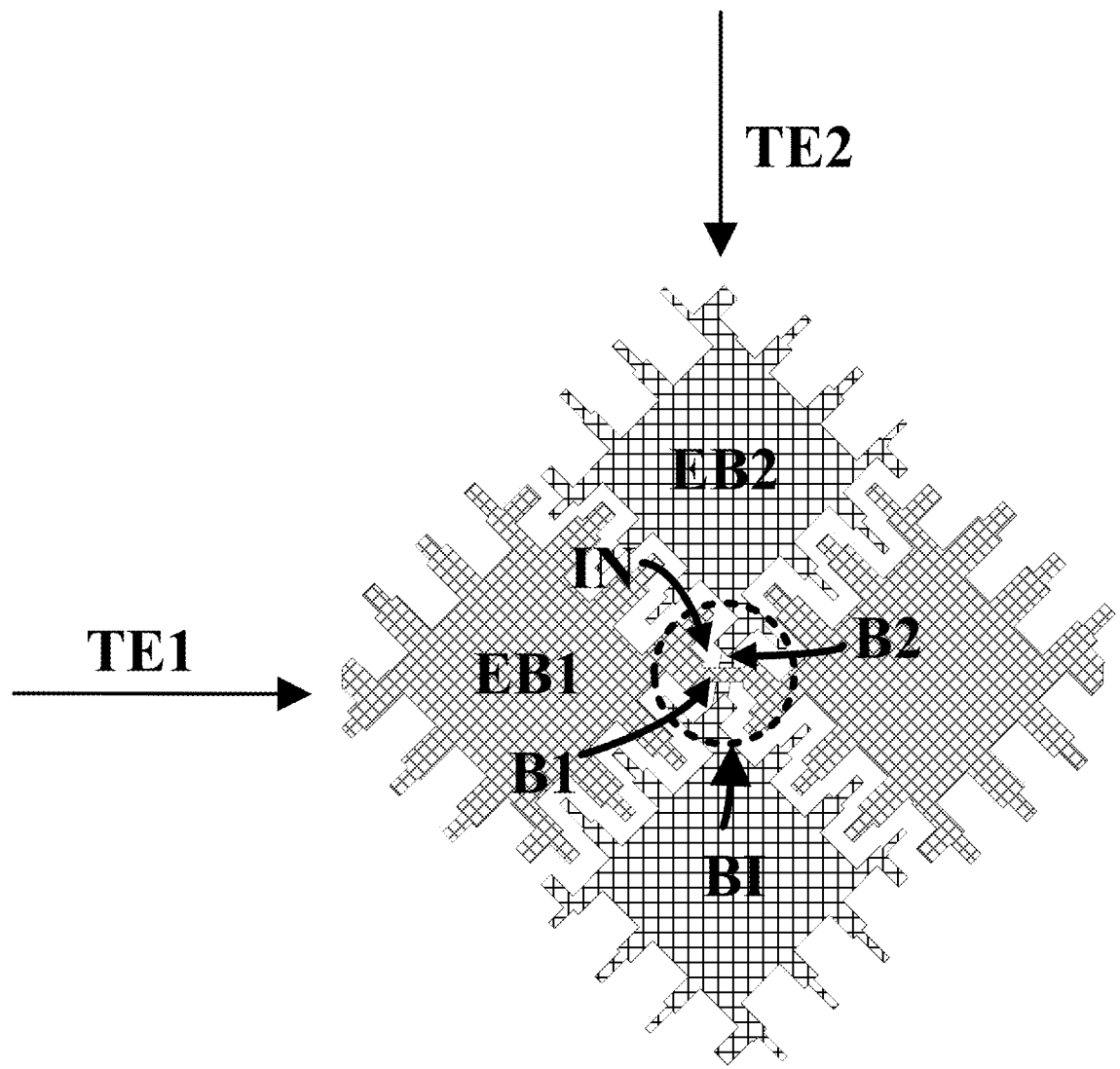
FIG. 2 is a zoom-in view of a region surrounding a bridge intersection in FIG. 1.

FIG. 2 is a zoom-in view of a region surrounding a bridge intersection in FIG. 1. Referring to FIG. 1 and FIG. 2, respectively at the plurality of bridge intersections BI, the plurality of first touch electrodes TE1 includes a plurality of first bridges B1. At a respective one of the plurality of bridge intersections BI, a respective one of the plurality of first bridges B1 connects two adjacent first touch electrode blocks of the first touch electrode blocks EB1 in a respective row. Respectively at the plurality of bridge intersections BI, the plurality of second touch electrodes TE2 includes a plurality of second bridges B2. At a respective one of the plurality of bridge intersections BI, a respective one of the plurality of second bridges B2 connects two adjacent second touch electrode blocks of the second touch electrode blocks EB2 in a respective column. Optionally, the touch control structure further includes an insulating layer IN insulating the respective one of the plurality of first bridges B1 and the respective one of the plurality of second bridges B2 at a same respective one of the plurality of bridge intersections BI from each other.

Figure 3:
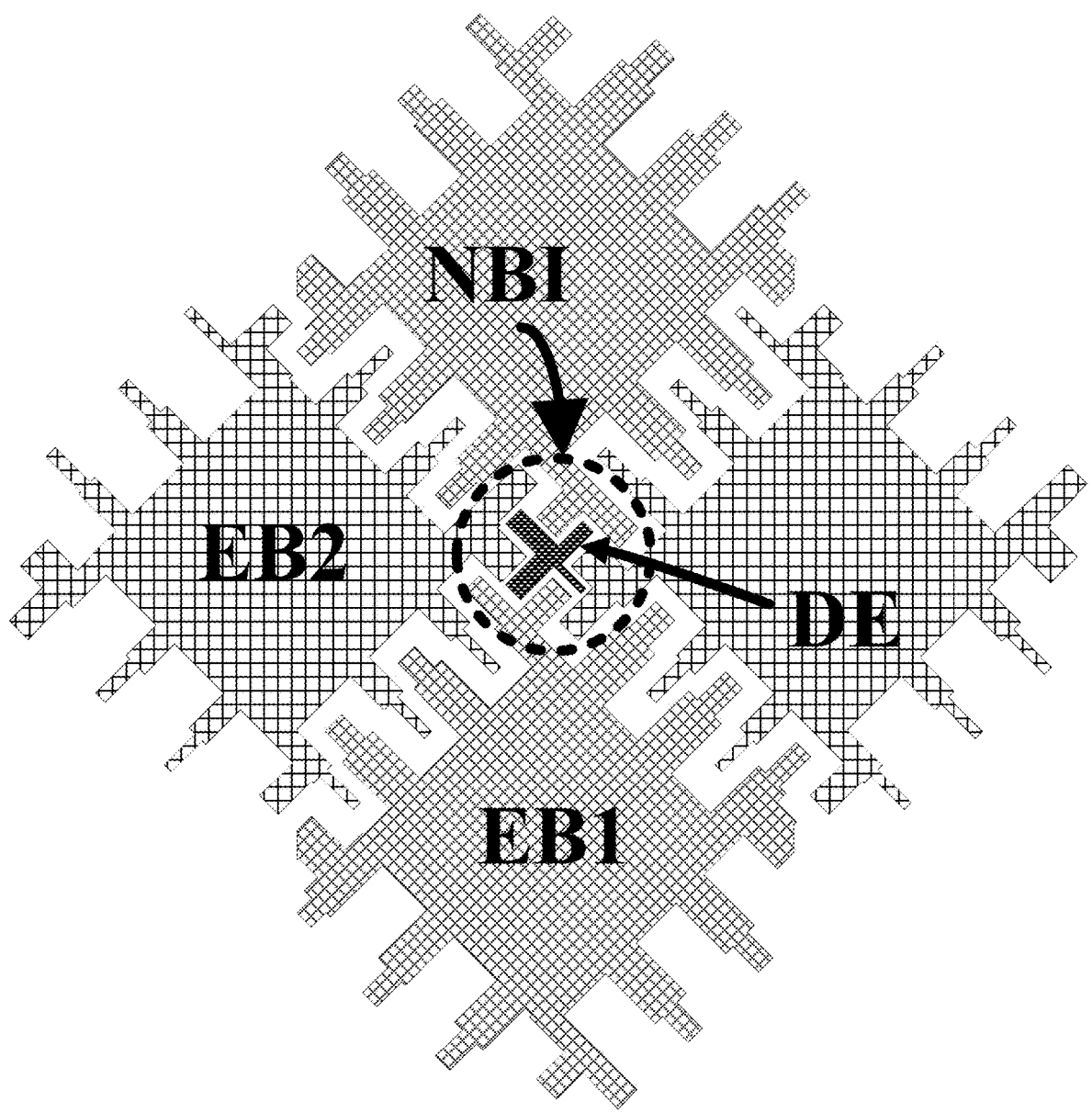
FIG. 3 is a zoom-in view of a region surrounding a non-bridge intersection in FIG. 1.

In some embodiments, the touch control structure at a respective one of the plurality of non-bridge intersections includes a respective one of a plurality of intersection fill patterns spaced apart from the first touch electrode blocks and the second touch electrode blocks. FIG. 3 is a zoom-in view of a region surrounding a non-bridge intersection in FIG. 1. Referring to FIG. 1 and FIG. 3, respectively at the plurality of non-bridge intersections NBI, the touch control structure includes a plurality of intersection fill patterns DE.

At a respective one of the plurality of non-bridge intersections NBI, a respective one of a plurality of intersection fill patterns DE is spaced apart from the first touch electrode blocks EB1 and the second touch electrode blocks EB2 surrounding the respective one of a plurality of intersection fill patterns DE. Optionally, the respective one of a plurality of intersection fill patterns DE is a floating fill pattern. As used herein, the term "floating" means electrically insulated from adjacent conductive elements or portions. For example, the respective one of a plurality of intersection fill patterns DE is spaced apart, and insulated, from adjacent electrode blocks of the first touch electrode blocks EB1 and the second touch electrode blocks EB2.

Optionally, the first touch electrode blocks EB1, the second touch electrode blocks EB2, and the plurality of intersection fill patterns DE are in a same layer and made of a same material (e.g., a mesh electrode material).

Figure 4:
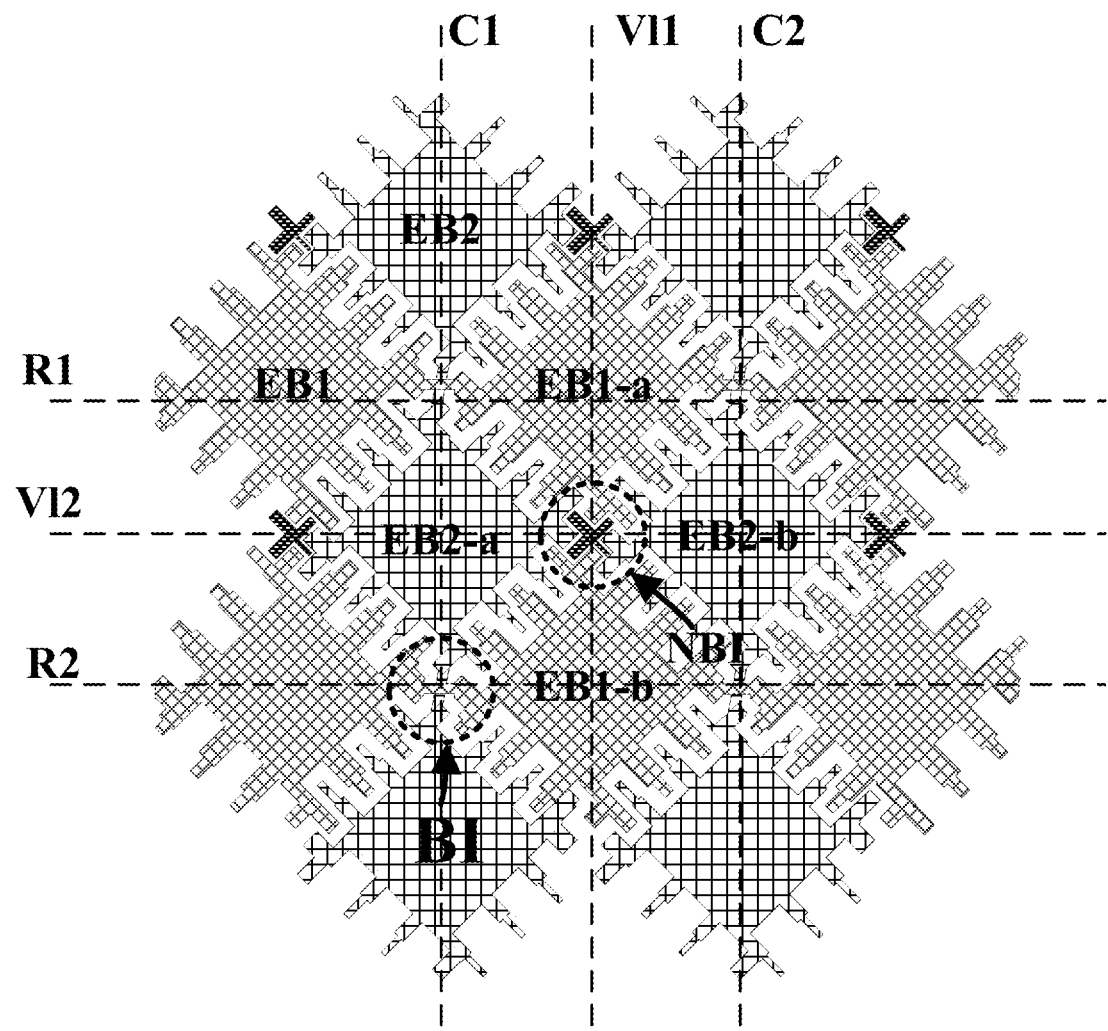
FIG. 4 is a zoom-in view of a region surrounding a non-bridge intersection in FIG. 1.

FIG. 4 is a zoom-in view of a region surrounding a non-bridge intersection in FIG. 1. Referring to FIG. 1 and FIG. 4, the respective one of the plurality of intersection fill patterns DE is in a space surrounded by two first touch electrode blocks respectively from two adjacent rows (e.g., an electrode block EB1-*a* from a first adjacent row R1 and an electrode block EB1-*b* from a second adjacent row R2) of the plurality of rows and two second touch electrode blocks respectively from two adjacent columns (e.g., an electrode block EB2-*a* from a first adjacent column C1 and an electrode block EB2-*b* from a second adjacent column C2) of the plurality of columns. The respective one of the plurality of intersection fill patterns DE is in an approximate center of four surrounding bridge intersections of the plurality of bridge intersections BI.

The two first touch electrode blocks respectively from the two adjacent rows (e.g., the electrode block EB1-*a* from the first adjacent row R1 and the electrode block EB1-*b* from the second adjacent row R2) are spaced apart from each other by the respective one of the plurality of intersection fill patterns DE. The two second touch electrode blocks respectively from the two adjacent columns (e.g., the electrode block EB2-*a* from the first adjacent column C1 and the electrode block EB2-*b* from the second adjacent column C2) are spaced apart from each other by the respective one of the plurality of intersection fill patterns DE.

Referring to FIG. 4 again, in some embodiments, a first virtual center line V11 of the two first touch electrode blocks respectively from the two adjacent rows (e.g., the electrode block EB1-*a* from the first adjacent row R1 and the electrode block EB1-*b* from the second adjacent row R2) crosses over the respective one of the plurality of intersection fill patterns DE. A second virtual center line V12 of the two second touch electrode blocks respectively from the two adjacent columns of the plurality of columns (e.g., the electrode block EB2-*a* from the first adjacent column C1 and the electrode block EB2-*b* from the second adjacent column C2) crosses over the respective one of the plurality of intersection fill patterns DE. Along the first virtual center line V11, the two first touch electrode blocks respectively from the two adjacent rows (e.g., the electrode block EB1-*a* from the first adjacent row R1 and the electrode block EB1-*b* from the second adjacent row R2) are insulated from each other, and spaced apart from each other by the respective one of the plurality of intersection fill patterns DE. Electrode blocks in each row (e.g., the first adjacent row R1 or the second adjacent row R2) are electrically connected through bridges (e.g., multiple ones of the plurality of first bridges B1 depicted in FIG. 2). Along the second virtual center line V12, the two second touch electrode blocks respectively from the two adjacent columns of the plurality of columns (e.g., the electrode block EB2-a from the first adjacent column C1 and the electrode block EB2-b from the second adjacent column C2) are insulated from each other, and spaced apart from each other by the respective one of the plurality of intersection fill patterns DE. Electrode blocks in each column (e.g., the first adjacent column C1 or the second adjacent column C2) are electrically connected through bridges (e.g., multiple ones of the plurality of second bridges B2 depicted in FIG. 2).

Figure 5:
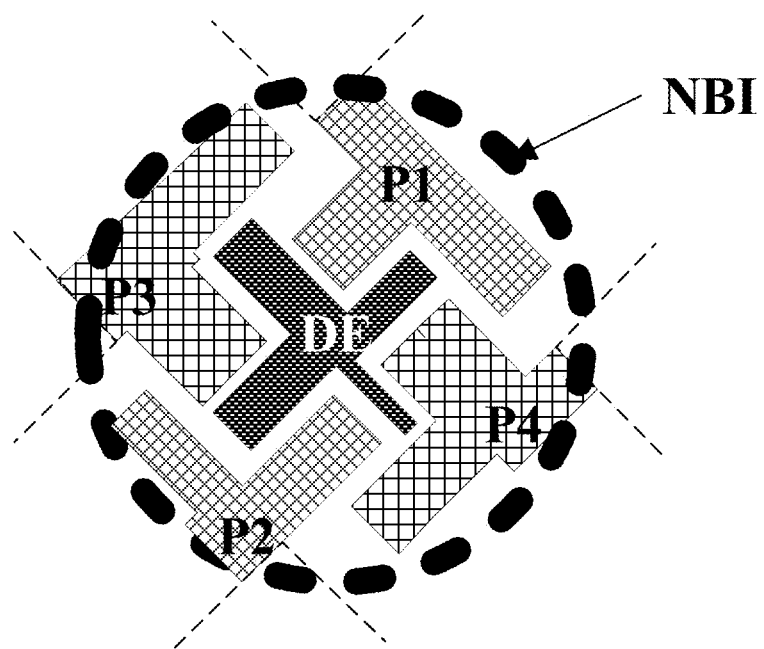
FIG. 5 is a further zoom-in view of a region surrounding a non-bridge intersection in FIG. 3.

FIG. 5 is a further zoom-in view of a region surrounding a non-bridge intersection in FIG. 3. Referring to FIG. 1, FIG. 3, and FIG. 5, in some embodiments, the respective one of the plurality of intersection fill patterns DE1 is in a space surrounded by a first portion P1, a second portion P2, a third portion P3, and a fourth portion P4. The first portion P1 and the second portion P2 are respectively from the first touch electrode blocks respectively from two adjacent rows of the plurality of rows (e.g., the electrode block EB1-a from the first adjacent row R1 and the electrode block EB1-b from the second adjacent row R2, as depicted in FIG. 4). The third portion and the fourth portion are respectively from the two second touch electrode blocks respectively from two adjacent columns of the plurality of columns (e.g., the electrode block EB2-a from the first adjacent column C1 and the electrode block EB2-b from the second adjacent column C2, as depicted in FIG. 4). The first portion P1 is respectively spaced apart from the second portion P2, the third portion P3, and the fourth portion P4 by the respective one of the plurality of intersection fill patterns DE. The second portion P2 is respectively spaced apart from the first portion, the third portion, and the fourth portion by the respective one of the plurality of intersection fill patterns DE. The third portion P3 is respectively spaced apart from the first portion, the second portion, and the fourth portion by the respective one of the plurality of intersection fill patterns DE. The fourth portion P4 is respectively spaced apart from the first portion, the second portion, and the third portion by the respective one of the plurality of intersection fill patterns DE. As shown in FIG. 1, FIG. 3, and FIG. 5, the first portion P1, the second portion P2, the third portion P3, and the fourth portion P4 are protrusions directly adjacent to the respective one of the plurality of intersection fill patterns DE.

Figure 6:
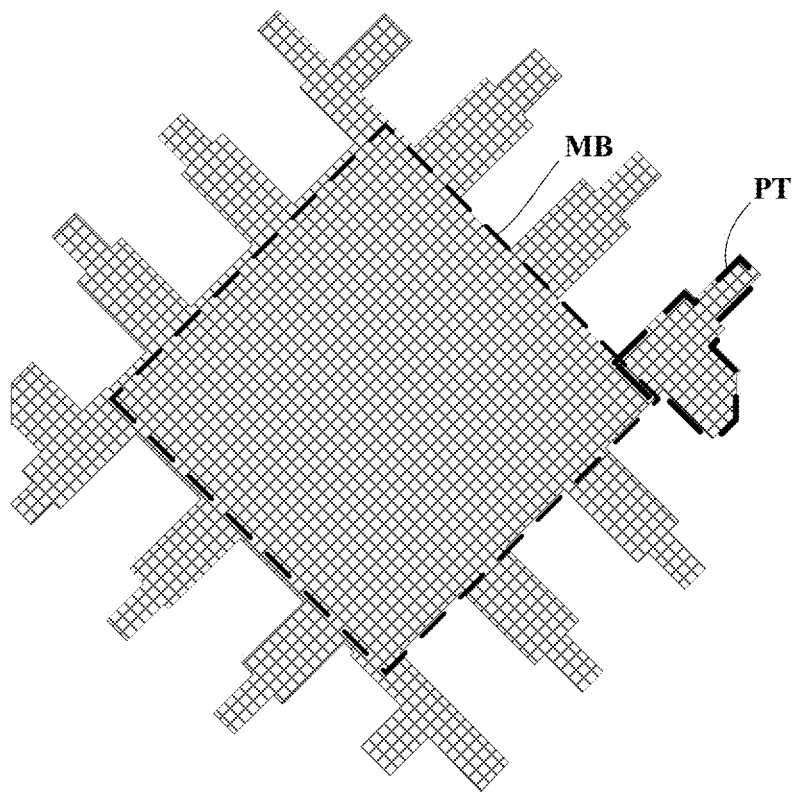
FIG. 6 illustrates the structure of an electrode block in some embodiments according to the present disclosure.

As used herein, the term "protrusion" refers to a portion of an electrode block protruding from a main portion of the electrode block, the main portion and the protrusion are on a same substrate surface. FIG. 6 illustrates the structure of an electrode block in some embodiments according to the present disclosure. Referring to FIG. 6, the electrode block includes a diamond shaped main portion MB, and a plurality of protrusions PT, each of which protruding from a side or an apex of the main portion MB of the electrode block. The main portion MB typically has a regular shape such as a square shape, a diamond shape, a rectangular shape, or a circular shape.

Figure 7A:
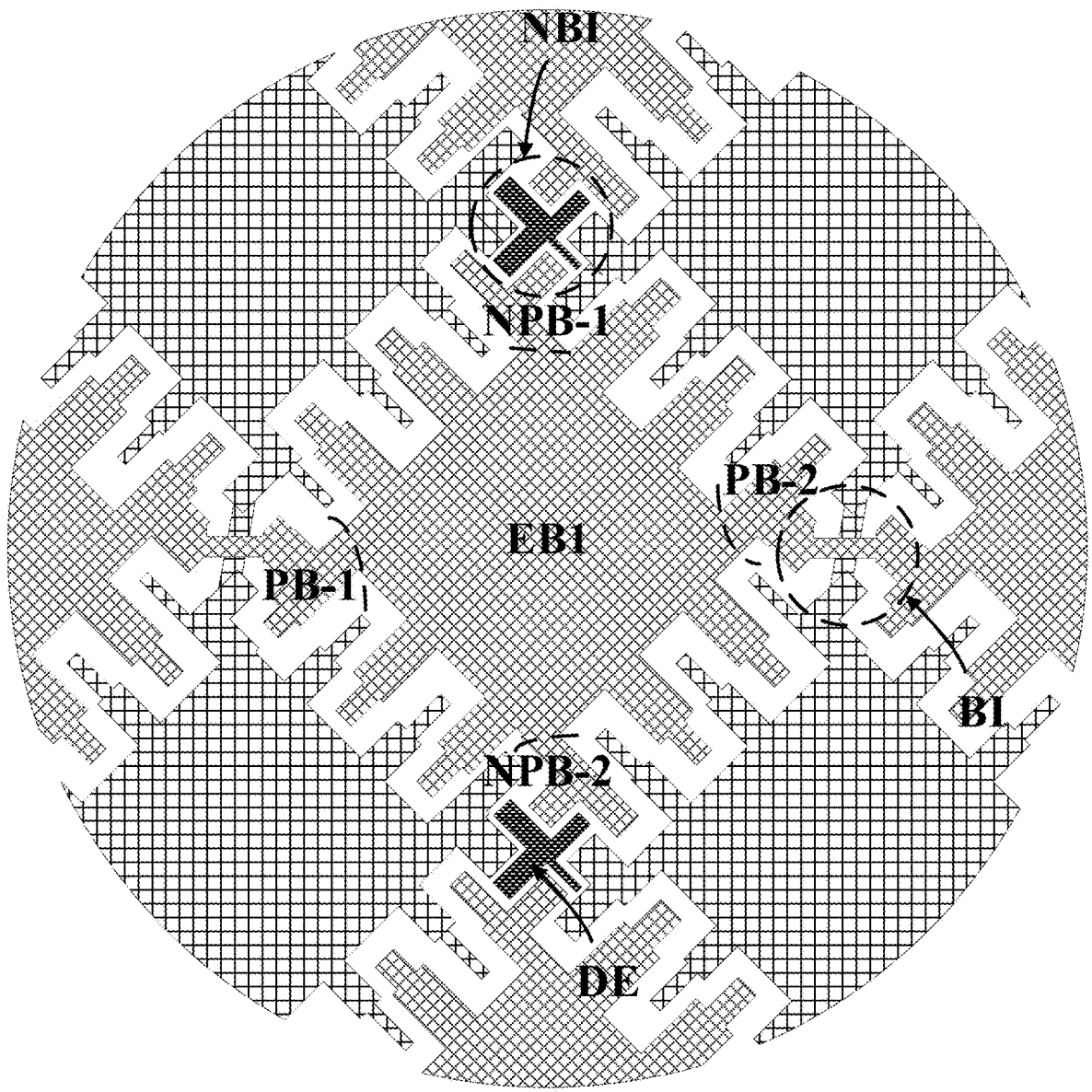
FIG. 7A is a zoom-in view of a region surrounding a first touch electrode block in FIG. 1.

In some embodiments, a respective first block of the first touch electrode blocks includes two first bridge protrusions along a row direction and two first non-bridge protrusions along a column direction. FIG. 7A is a zoom-in view of a region surrounding a first touch electrode block in FIG. 1. Referring to FIG. 1 and FIG. 7A, a respective first block of the first touch electrode blocks EB1 in some embodiments includes two first bridge protrusions (e.g., protrusions PB-1 and PB-2) along the row direction and two first non-bridge protrusions (e.g., protrusions NPB-1 and NPB-2) along a column direction. The two first bridge protrusions PB-1 and PB-2 are respectively connected to two adjacent first touch electrode blocks respectively through two adjacent bridge intersections of the plurality of bridge intersections BI along the row direction. The two first non-bridge protrusions NPB-1 and NPB-2 are respectively directly adjacent to two adjacent fill patterns of the plurality of intersection fill patterns DE respectively at two adjacent non-bridge intersections of the plurality of non-bridge intersections NBI along the column direction.

Figure 7B:
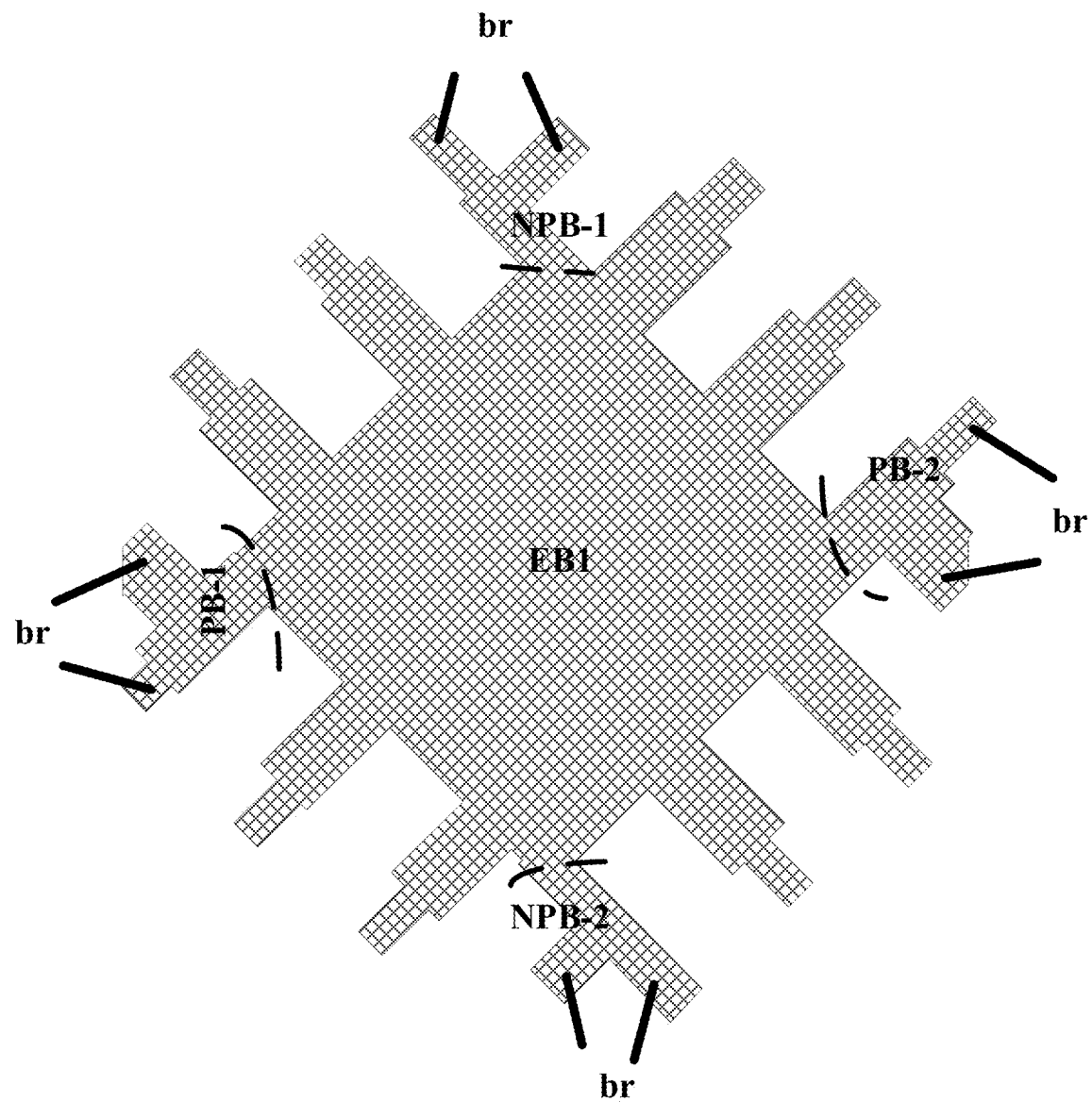
FIG. 7B illustrates the structure of protrusions in the first touch electrode block in FIG. 7A.

FIG. 7B illustrates the structure of protrusions in the first touch electrode block in FIG. 7A. Referring to FIG. 7A and FIG. 7B, the two first non-bridge protrusions NPB-1 and NPB-2 are substantially intact compared with the two first bridge protrusions PB-1 and PB-2. For example, each of the two first bridge protrusions PB-1 and PB-2 has a first number of branches; each of the two first non-bridge protrusions NPB-1 and NPB-2 has a second number of branches; and the first number of branches equals to the second number of branches. Referring to FIG. 7A and FIG. 7B, the NPB-1 has two branches br, the NPB-2 has two branches br, the PB-1 has two branches br, and the PB-2 also has two branches br. Each of the two first bridge protrusions and the two first non-bridge protrusions has a same number of branches. As used herein, the term "substantially intact" refers to at least 50 percent, e.g., at least 60 percent, at least 70 percent, at least 80 percent, at least 90 percent, at least 95 percent, at least 99 percent, or 100 percent intact.

In some embodiments, each of the two first non-bridge protrusions includes two branches br. Referring to FIG. 7A and FIG. 7B, a first respective one of the plurality of intersection fill patterns DE is directly adjacent to two branches of a first respective one (NPB-1) of the two first non-bridge protrusions; and a second respective one of the plurality of intersection fill patterns DE is directly adjacent to two branches of a second respective one (NPB-2) of the two first non-bridge protrusions.

Figure 8A:
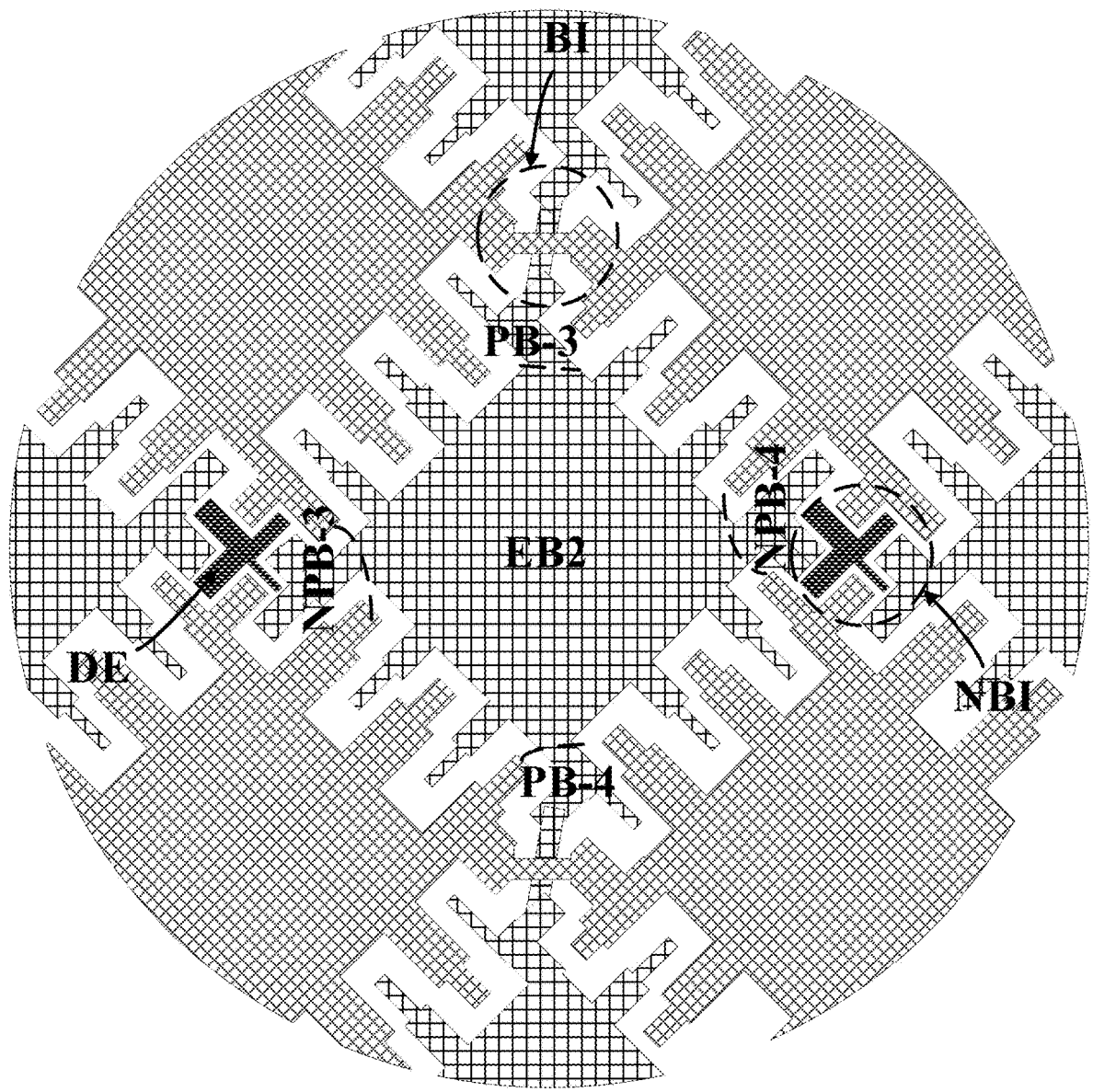
FIG. 8A is a zoom-in view of a region surrounding a second touch electrode block in FIG. 1.

In some embodiments, a respective second block of the second touch electrode blocks includes two second bridge protrusions along a column direction and two second non-bridge protrusions along a row direction. FIG. 8A is a zoom-in view of a region surrounding a second touch electrode block in FIG. 1. Referring to FIG. 1 and FIG. 8A, a respective second block of the second touch electrode blocks EB2 in some embodiments includes two second bridge protrusions (e.g., protrusions PB-3 and PB-4) along the column direction and two second non-bridge protrusions (e.g., protrusions NPB-3 and NPB-4) along a row direction. The two second bridge protrusions PB-3 and PB-4 are respectively connected to two adjacent second touch electrode blocks respectively through two adjacent bridge intersections of the plurality of bridge intersections BI along the column direction. The two second non-bridge protrusions NPB-3 and NPB-4 are respectively directly adjacent to two adjacent fill patterns of the plurality of intersection fill patterns DE respectively at two adjacent non-bridge intersections of the plurality of non-bridge intersections NBI along the row direction.

Figure 8B:
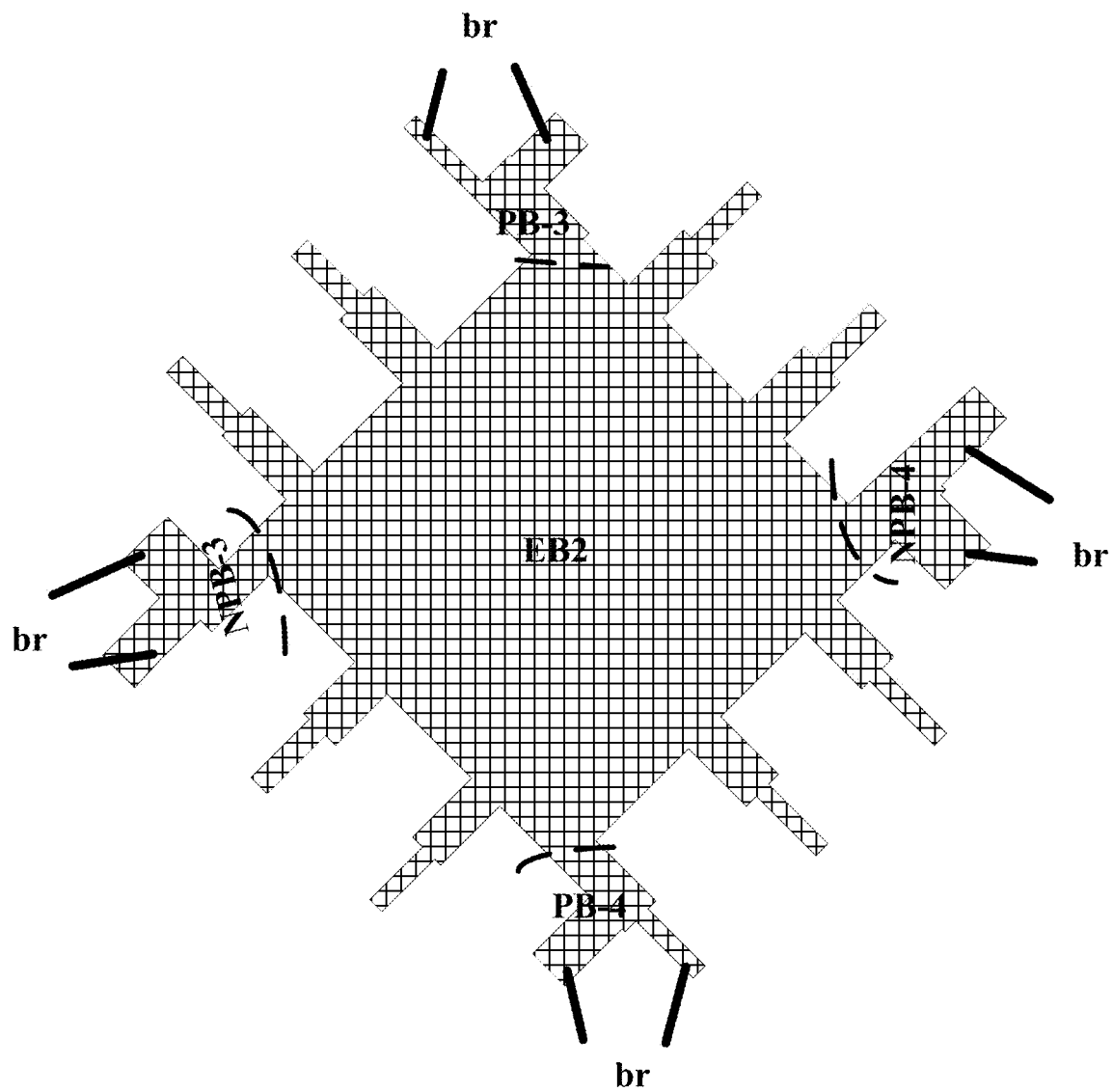
FIG. 8B illustrates the structure of protrusions in the second touch electrode block in FIG. 8A.

FIG. 8B illustrates the structure of protrusions in the second touch electrode block in FIG. 8A. Referring to FIG. 8A and FIG. 8B, the two second non-bridge protrusions NPB-3 and NPB-4 are substantially intact compared with the two second bridge protrusions PB-3 and PB-4. For example, each of the two second bridge protrusions has a third number of branches; each of the two second non-bridge protrusions has a fourth number of branches; and the third number of branches equals to the fourth number of branches. Referring to FIG. 8A and FIG. 8B, the NPB-3 has two branches br, the NPB-4 has two branches br, the PB-3 has two branches br, and the PB-4 also has two branches br. Each of the two second bridge protrusions and the two second non-bridge protrusions has a same number of branches.

In some embodiments, each of the two second non-bridge protrusions includes two branches br. Referring to FIG. 8A and FIG. 8B, a third respective one of the plurality of intersection fill patterns DE is directly adjacent to two branches of a third respective one (NPB-3) of the two second non-bridge protrusions; and a fourth respective one of the plurality of intersection fill patterns is directly adjacent to two branches of a fourth respective one (NPB-4) of the two second non-bridge protrusions.

Figure 9:
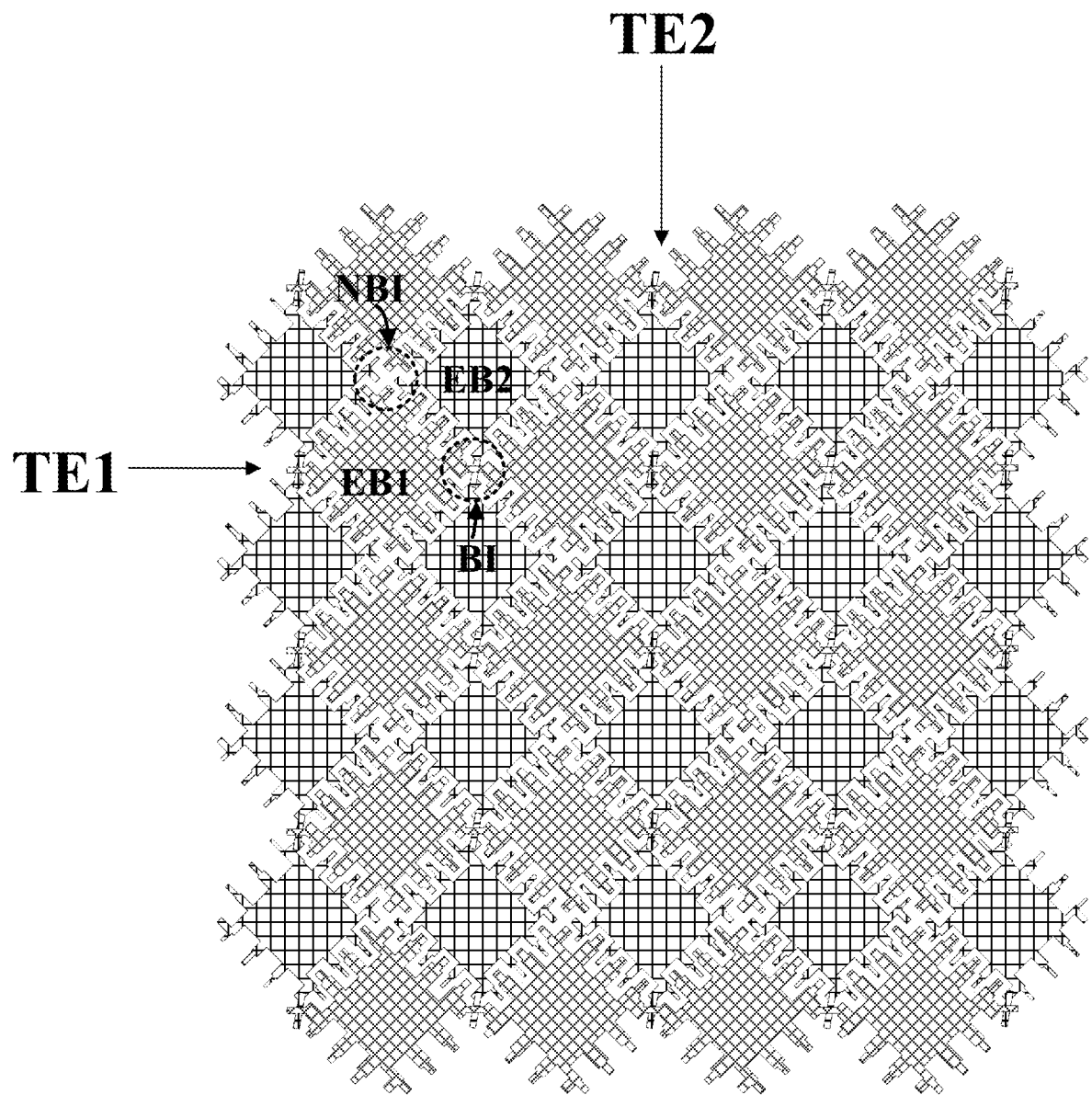
FIG. 9 is a schematic diagram illustrating the structure of a touch control structure in some embodiments according to the present disclosure.
Figure 10:
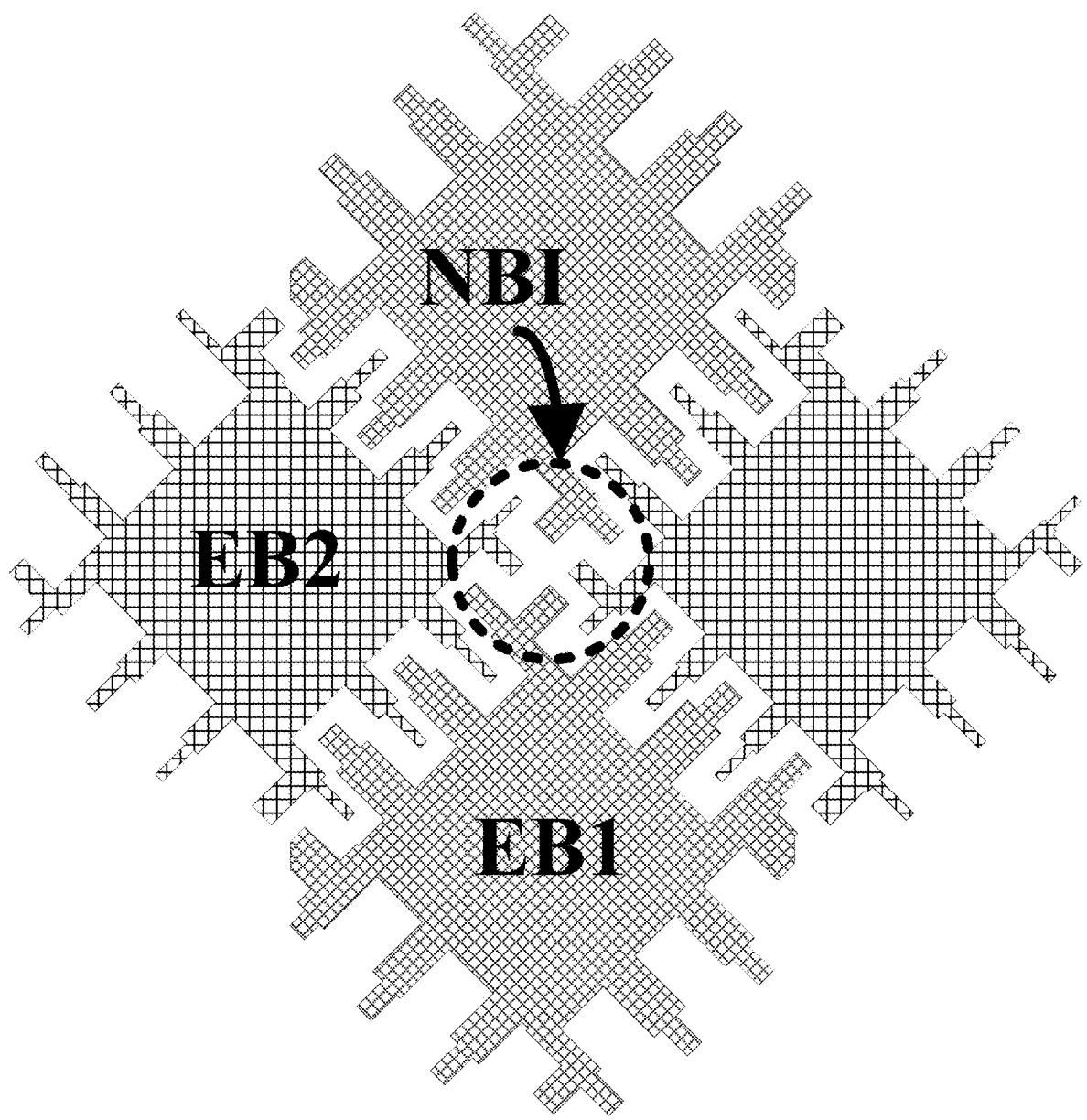
FIG. 10 is a zoom-in view of a region surrounding a non-bridge intersection in FIG. 9.

FIG. 9 is a schematic diagram illustrating the structure of a touch control structure in some embodiments according to the present disclosure. FIG. 10 is a zoom-in view of a region surrounding a non-bridge intersection in FIG. 9. The touch control structure in FIG. 9 and FIG. 10 is absent of any intersection fill pattern in the plurality of non-bridge intersections NBI.

Mutual capacitance between adjacent first and second touch electrode block (e.g., mutual capacitance between adjacent touch scanning electrode Tx and touch sensing electrode Rx) significantly affects touch performance of a touch control structure. The higher the value of the mutual capacitance, the longer the signal loading would be. Often times, the mutual capacitance in a touch control structure is relatively large such that the signal loading time is relatively long. Comparing the touch control structure in FIG. 1 with the touch control structure in FIG. 9, by having a fill pattern in a non-bridge intersection of the touch control structure, the mutual capacitance between adjacent touch scanning electrode Tx and touch sensing electrode Rx can be effectively controlled, e.g., decreased. Comparing with the touch control structure in FIG. 9, the touch control structure in FIG. 1 has a relatively lower mutual capacitance between adjacent first and second touch electrode block, resulting in an increase in signal loading time in the touch control structure, leading to enhanced touch performance.

TABLE 1

Parameters measured in touch control structures in some embodiments according to the present disclosure.

|  | Touch control structure of FIG. 9 | Touch control structure of FIG. 1 |
| --- | --- | --- |
| Surface area ratio | 0 | 0.4 |
| Cm (pF) | 1.017 | 1.011 |
| Cm' (pF) | 0.963 | 0.957 |
| ΔCm (pF) | 0.054 | 0.054 |
| ΔCm/Cm | 5.3% | 5.33% |
| Cp1 (pF) | 9.76 | 9.77 |
| Cp2 (pF) | 11.19 | 11.15 |
| R1 (Ω) | 28.2 | 25.8 |
| R2 (Ω) | 25.5 | 24.5 |

Table 1 summarizes parameters measured in touch control structures in some embodiments according to the present disclosure. The parameter "surface area ratio" in table 1 refers to a ratio between a first total surface area of the plurality of intersection fill patterns and a second total combined surface area of the first touch electrode blocks, the second touch electrode blocks, and the plurality of intersection fill patterns. The surface area ratio is zero in the touch control structure of FIG. 9 because it does not have any intersection fill patterns. The surface area ratio in the touch control structure of FIG. 1 is 0.4%. The parameter Cm in table 1 refers to mutual capacitance between first touch electrode blocks and second touch electrode blocks (e.g., Tx and Rx) in absence of a touch on the touch control structure. The parameter Cm' in table 1 refers to mutual capacitance between first touch electrode blocks and second touch electrode blocks (e.g., Tx and Rx) upon a touch on the touch control structure. The parameter ΔCm in table 1 refers to a capacitance difference (Cm−Cm'). The parameter Cp1 in table 1 refers to self-capacitance of the first touch electrode blocks. The parameter Cp2 in table 1 refers to self-capacitance of the second touch electrode blocks. The parameter R1 in table 1 refers to resistance of the first touch electrode blocks. The parameter R2 in table 1 refers to resistance of the second touch electrode blocks. As used herein, the term "surface area" refers to an area occupied by the electrode blocks or the fill patterns. In case the electrode blocks or fill patterns are mesh electrode blocks or mesh patterns, the "area occupied by" refers to an area encircled by outer boundaries (forms by line breaks in the mesh lines) respectively of the electrode blocks and the fill patterns.

Comparing the touch control structure in FIG. 1 with the touch control structure in FIG. 9, by having a fill pattern in a non-bridge intersection of the touch control structure, the mutual capacitance Cm or Cm' decreases, while the capacitance difference ΔCm remain the same. The parameter ΔCm/Cm increases, while resistance R1 of the first touch electrode blocks and resistance R2 of the second touch electrode blocks both decrease. Thus, by having a fill pattern in a non-bridge intersection of the touch control structure, the signal loading time of the touch control structure can be lowered significantly.

Figure 11:
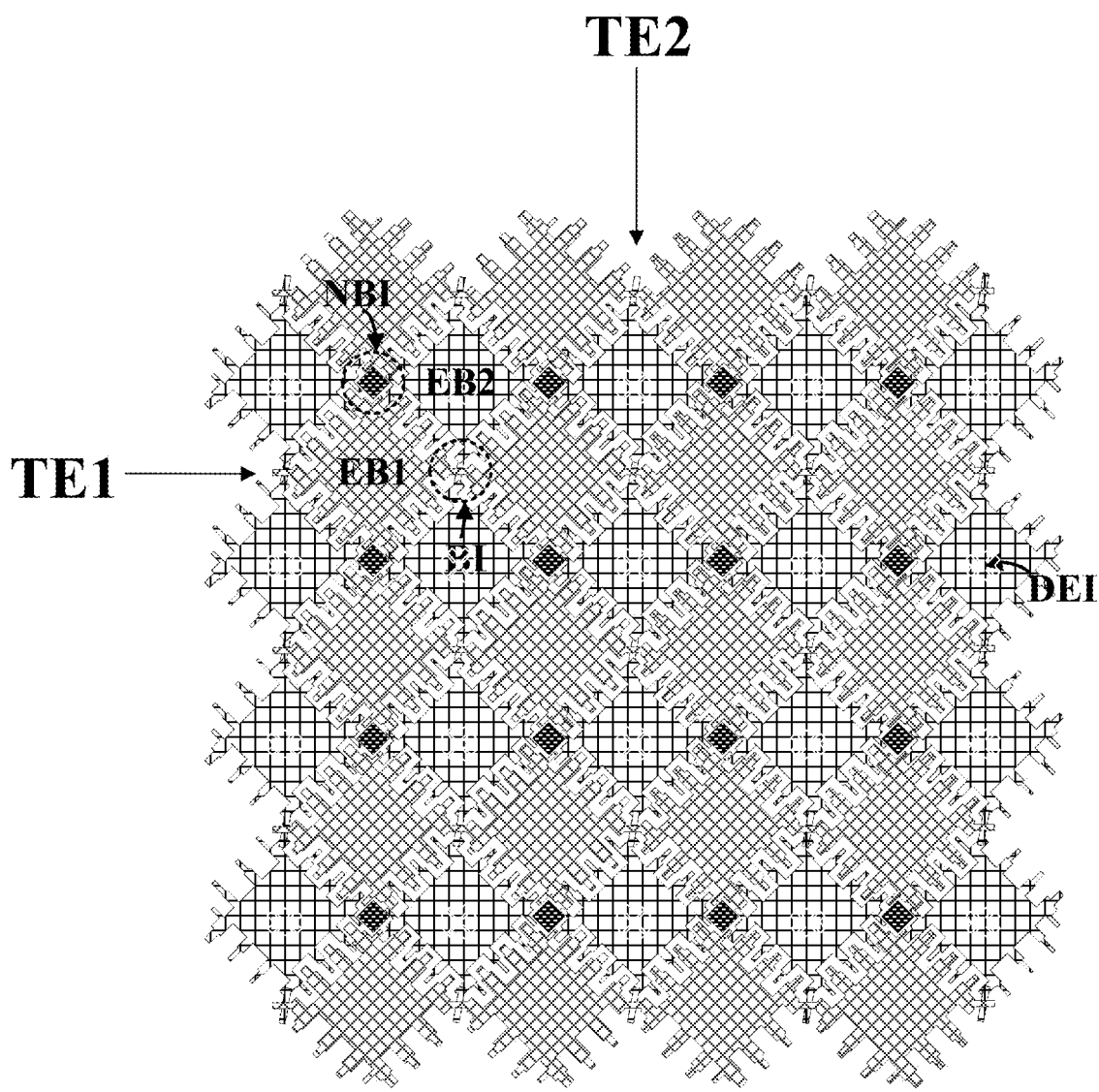
FIG. 11 is a schematic diagram illustrating the structure of a touch control structure in some embodiments according to the present disclosure.
Figure 12:
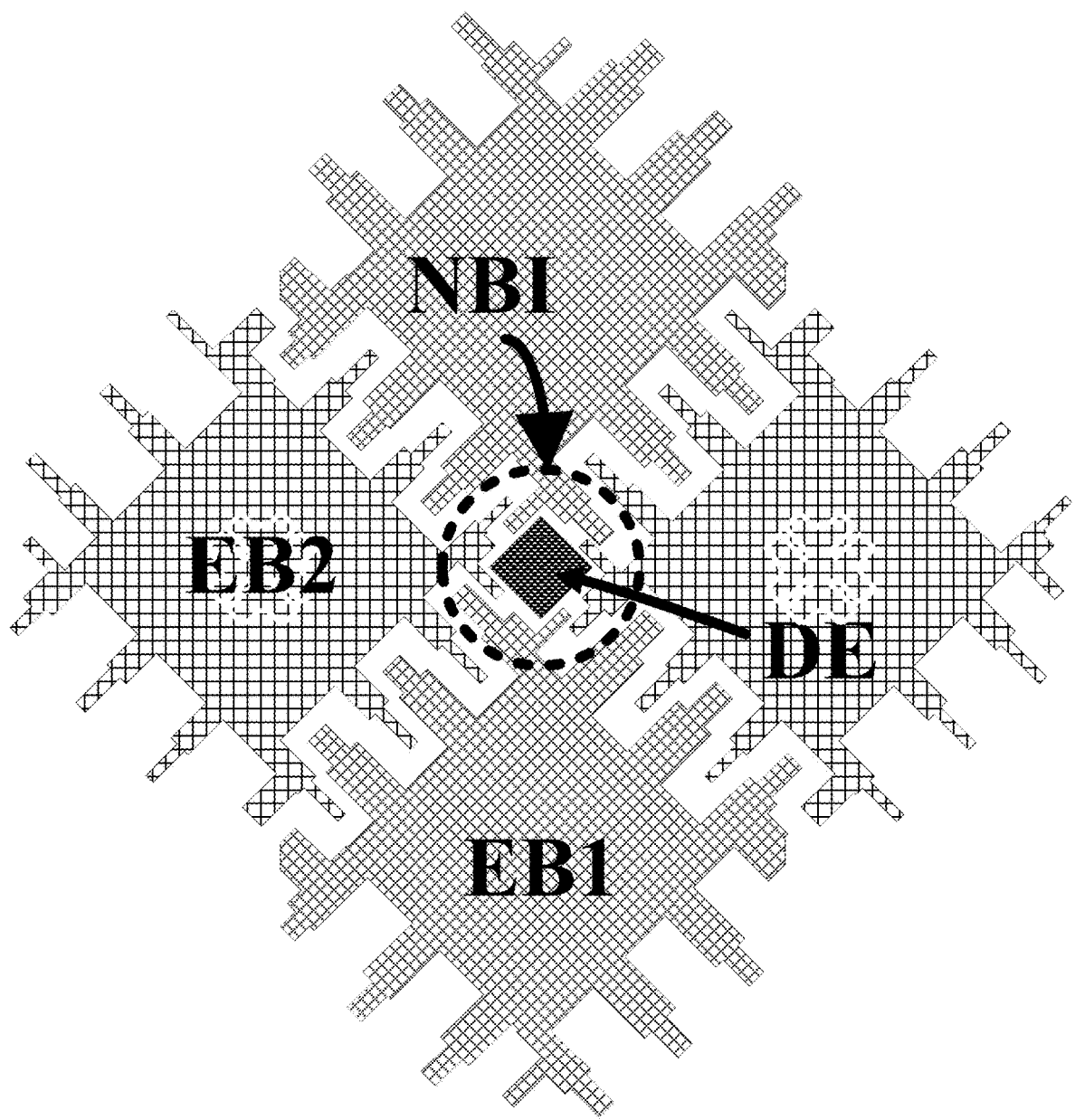
FIG. 12 is a zoom-in view of a region surrounding a non-bridge intersection in FIG. 11.
Figure 13A:
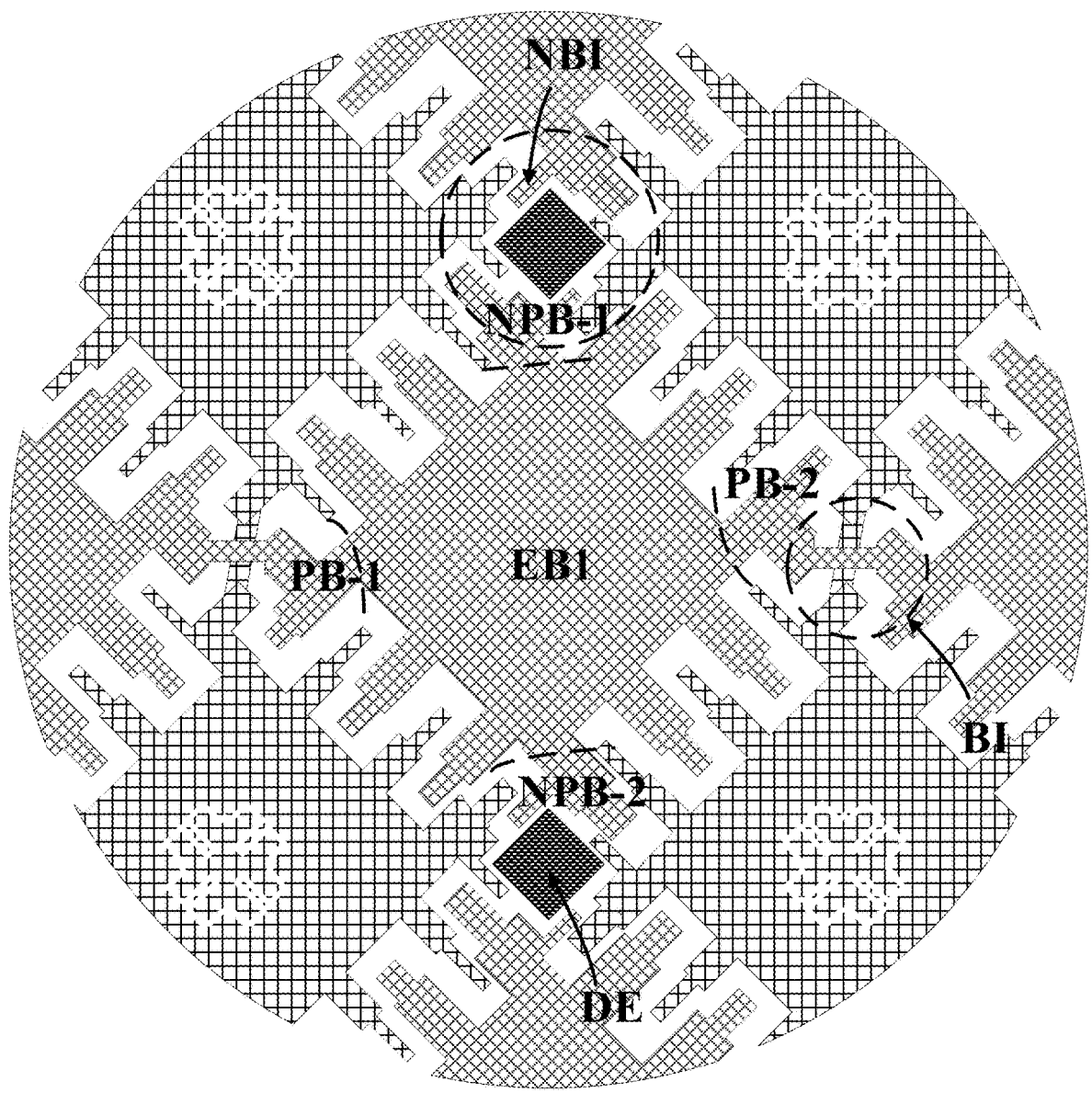
FIG. 13A is a zoom-in view of a region surrounding a first touch electrode block in FIG. 11.
Figure 13B:
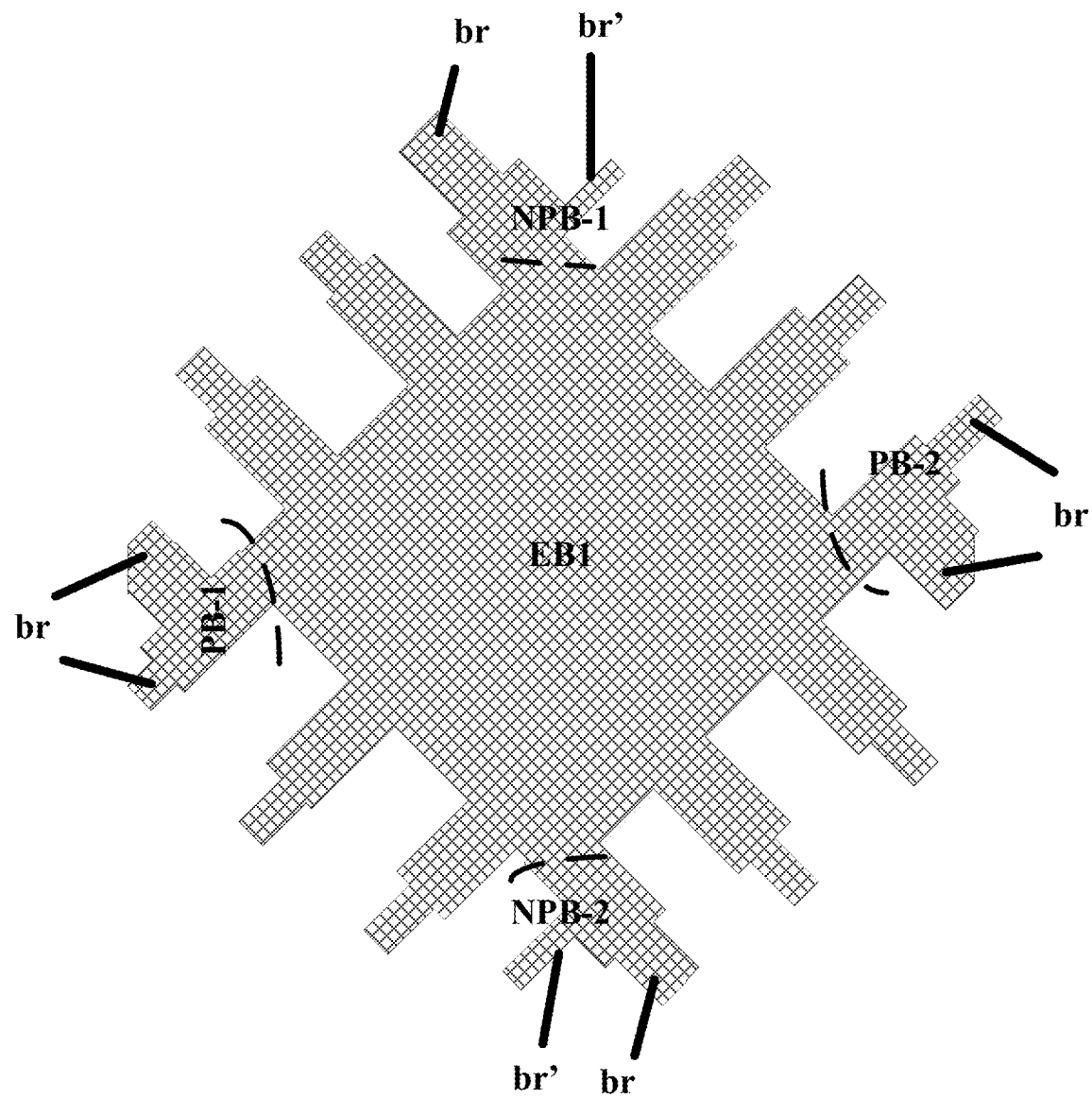
FIG. 13B illustrates the structure of protrusions in the first touch electrode block in FIG. 13A.
Figure 14A:
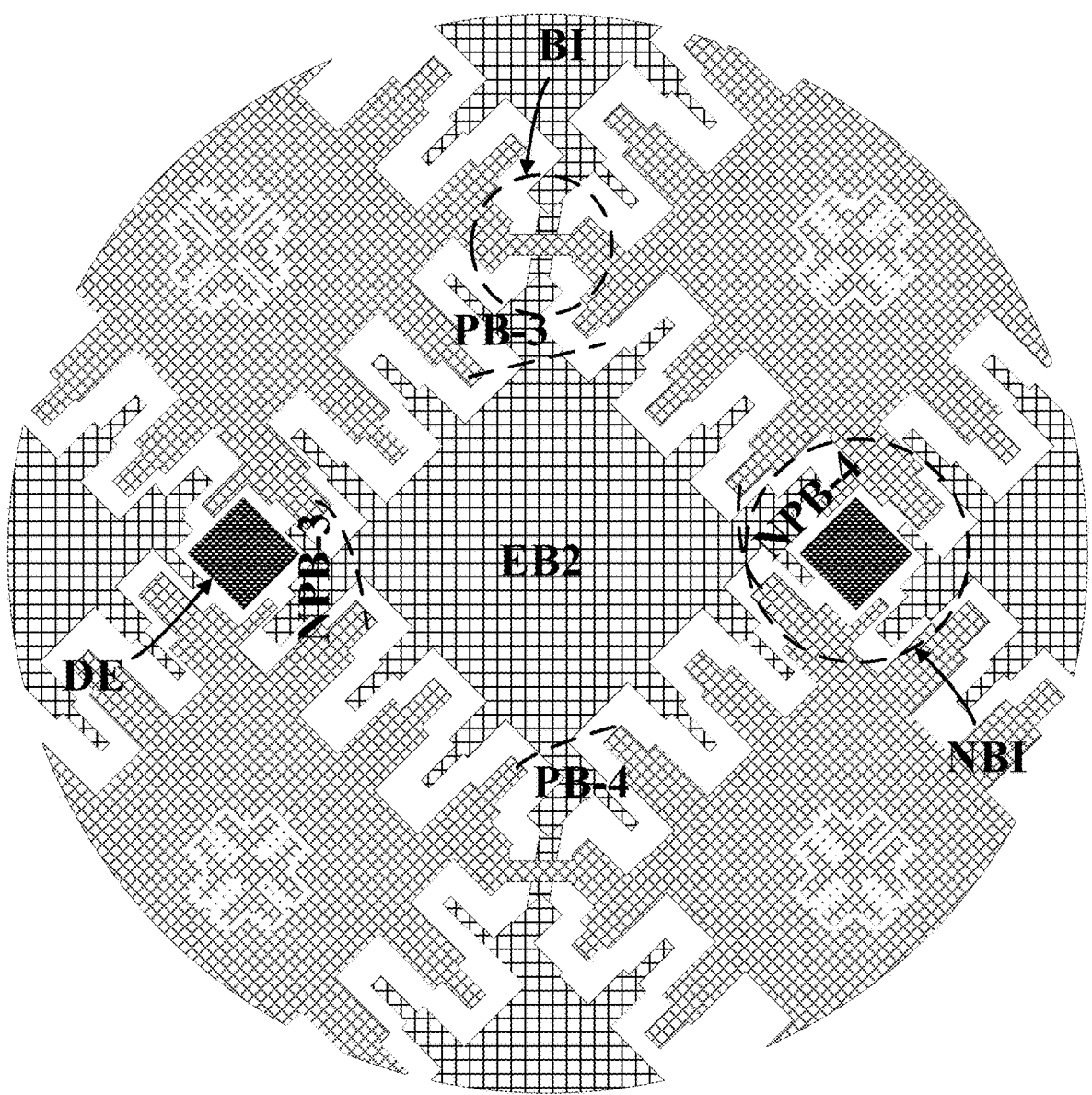
FIG. 14A is a zoom-in view of a region surrounding a second touch electrode block in FIG. 11.
Figure 14B:
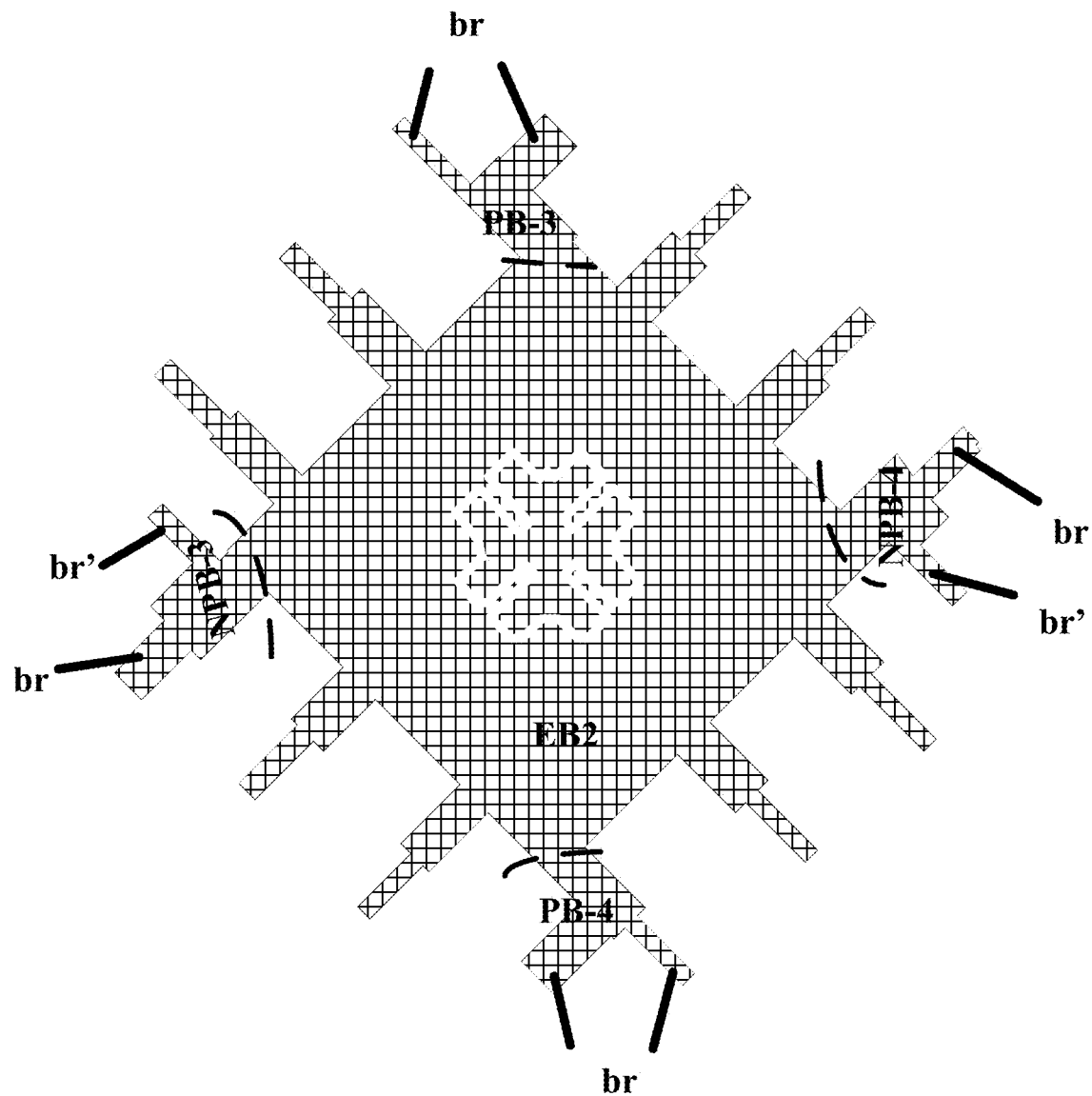
FIG. 14B illustrates the structure of protrusions in the second touch electrode block in FIG. 14A.

In some embodiments, the two first non-bridge protrusions are at least partially truncated compared with the two first bridge protrusions. In some embodiments, the two second non-bridge protrusions are at least partially truncated compared with the two second bridge protrusions. FIG. 11 is a schematic diagram illustrating the structure of a touch control structure in some embodiments according to the present disclosure. FIG. 12 is a zoom-in view of a region surrounding a non-bridge intersection in FIG. 11. FIG. 13A is a zoom-in view of a region surrounding a first touch electrode block in FIG. 11. FIG. 13B illustrates the structure of protrusions in the first touch electrode block in FIG. 13A. FIG. 14A is a zoom-in view of a region surrounding a second touch electrode block in FIG. 11. FIG. 14B illustrates the structure of protrusions in the second touch electrode block in FIG. 14A. Referring to FIGS. 11, 12, 13A, 13B, 14A, and 14B, the respective one of the plurality of fill patterns DE has a greater surface area as compared to the respective one of the plurality of fill patterns DE depicted in FIGS. 1-6, 7A, 7B, 8A, and 8B. To make space for forming the respective one of the plurality of fill patterns DE in FIGS. 11, 12, 13A, 13B, 14A, and 14B, at least one of the protrusions at the respective one of the plurality of non-bridge intersections NBI is at least partially truncated.

Comparing the first touch electrode block in FIG. 13B with the first touch electrode block in FIG. 7B, each of the two first non-bridge protrusions NPB-1 and NPB-2 in FIG. 13B is at least partially truncated as compared to their counterparts in FIG. 7B. As shown in FIG. 13B, NPB-1 has at least a partially truncated branch br', and NPB-2 also has at least a partially truncated branch br'. Comparing the second touch electrode block in FIG. 14B with the second touch electrode block in FIG. 8B, each of the two second non-bridge protrusions NPB-3 and NPB-4 in FIG. 14B is at least partially truncated as compared to their counterparts in FIG. 8B. As shown in FIG. 14B, NPB-3 has at least a partially truncated branch br', and NPB-4 also has at least a partially truncated branch br'.

In some embodiments, the two first non-bridge protrusions are at least partially truncated compared with the two first bridge protrusions. Referring to FIG. 13A and FIG. 13B, each of the two first non-bridge protrusions NPB-1 and NPB-2 is at least partially truncated compared with the two first bridge protrusions PB-1 and PB-2. For example, the PB-1 has two branches br, and the PB-2 also has two branches br. The NPB-1 has a branch br that is substantially intact and a branch br' that is at least partially truncated, as compared to the two branches br in the PB-1 and the PB-2. The NPB-2 also has a branch br that is substantially intact and a branch br' that is at least partially truncated, as compared to the two branches br in the PB-1 and the PB-2.

In some embodiments, the two second non-bridge protrusions are at least partially truncated compared with the two second bridge protrusions. Referring to FIG. 14A and FIG. 14B, each of the two second non-bridge protrusions NPB-3 and NPB-4 is at least partially truncated compared with the two second bridge protrusions PB-3 and PB-4. For example, the PB-3 has two branches br, and the PB-4 also has two branches br. The NPB-3 has a branch br that is substantially intact and a branch br' that is at least partially truncated, as compared to the two branches br in the PB-3 and the PB-4. The NPB-4 also has a branch br that is substantially intact and a branch br' that is at least partially truncated, as compared to the two branches br in the PB-3 and the PB-4.

TABLE 2

Parameters measured in touch control structures in some embodiments according to the present disclosure.

| | Touch control structure of FIG. 11 | Touch control structure of FIG. 1 |
|---|---|---|
| Surface area ratio | 0.6 | 0.4 |
| Cm (pF) | 0.988 | 1.011 |
| Cm' (pF) | 0.934 | 0.957 |
| ΔCm (pF) | 0.054 | 0.054 |
| ΔCm/Cm | 5.5% | 5.33% |
| Cp1 (pF) | 9.6 | 9.77 |
| Cp2 (pF) | 11.1 | 11.15 |
| R1 (Ω) | 25.8 | 25.8 |
| R2 (Ω) | 24.5 | 24.5 |

Table 2 summarizes parameters measured in touch control structures in some embodiments according to the present disclosure. The surface area ratio in the touch control structure of FIG. 1 is 0.4%. The surface area ratio in the touch control structure of FIG. 11 is increased to 0.6%. With the surface area ratio increased and the protrusions of the touch electrode blocks remain mostly intact (though may be partially truncated), the mutual capacitance Cm and Cm' further decrease to lower values (0.988 and 0.934, respectively), though the capacitance difference ΔCm remain substantially unchanged. The ΔCm/Cm value further increases (from 5.33% to 5.5%). Resistance R1 of the first touch electrode blocks and resistance R2 of the second touch electrode blocks are not affected by the increased surface area ratio, and remain substantially the same as those valued in the touch control structure of FIG. 1.

Comparing the touch control structure in FIG. 1 with the touch control structure in FIG. 11, by further increasing the surface area of the fill pattern while maintaining the protrusions of the touch electrode blocks substantially intact, the mutual capacitance Cm or Cm' can be further decreased without increasing resistance of the touch electrode blocks. The signal loading time of the touch control structure can be further lowered. The touch performance of the touch control structure can be further enhanced.

In some embodiments, and referring to FIG. 11, the touch control structure further includes a plurality of internal fill patterns DEI respectively surrounded by, by insulated from, electrode blocks of the plurality of second touch electrodes TE2. Optionally, the plurality of internal fill patterns DEI are absent in the plurality of first touch electrodes TE1 In some embodiments, the plurality of internal fill patterns DEI are mesh patterns made of mesh lines. The periphery of a respective one of the plurality of internal fill patterns DEI is insulated from a respective second touch electrode block by line breaks in the mesh lines of the mesh patterns. Optionally, the periphery of the respective one of the plurality of internal fill patterns DEI is formed by line breaks in the mesh lines of the mesh patterns. In some embodiments, the electrode blocks of the plurality of first touch electrodes and the plurality of second touch electrodes, and the plurality of internal fill patterns DEI, are formed from a mesh layer. For example, the electrode blocks of the plurality of first touch electrodes and the plurality of second touch electrodes, and the plurality of internal fill patterns DEI, are formed by forming a mesh layer on a base substrate, and patterning the mesh layer to form the electrode blocks of the plurality of first touch electrodes and the plurality of second touch electrodes, and the plurality of internal fill patterns DEI.

Figure 15:
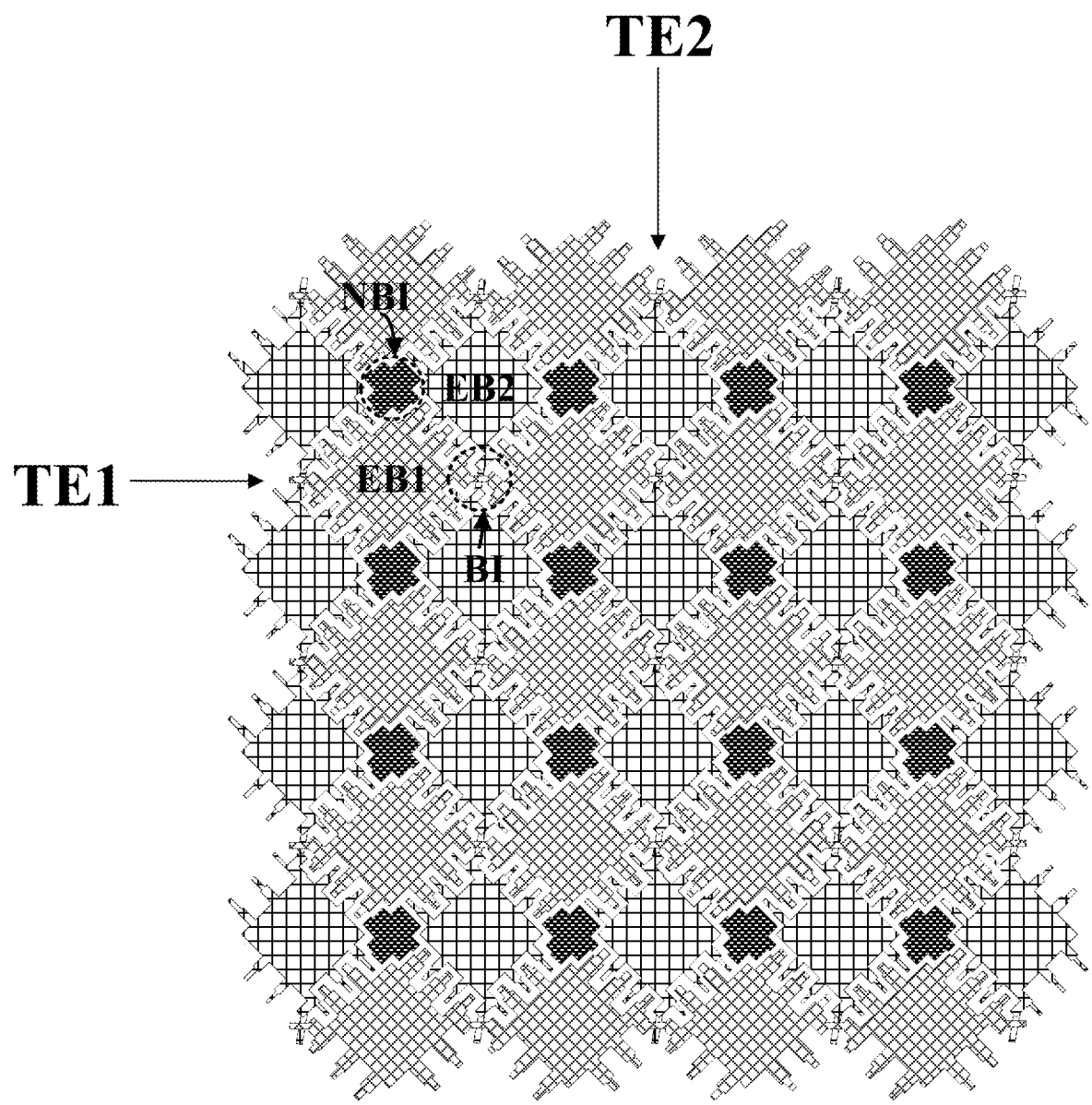
FIG. 15 is a schematic diagram illustrating the structure of a touch control structure in some embodiments according to the present disclosure.
Figure 16:
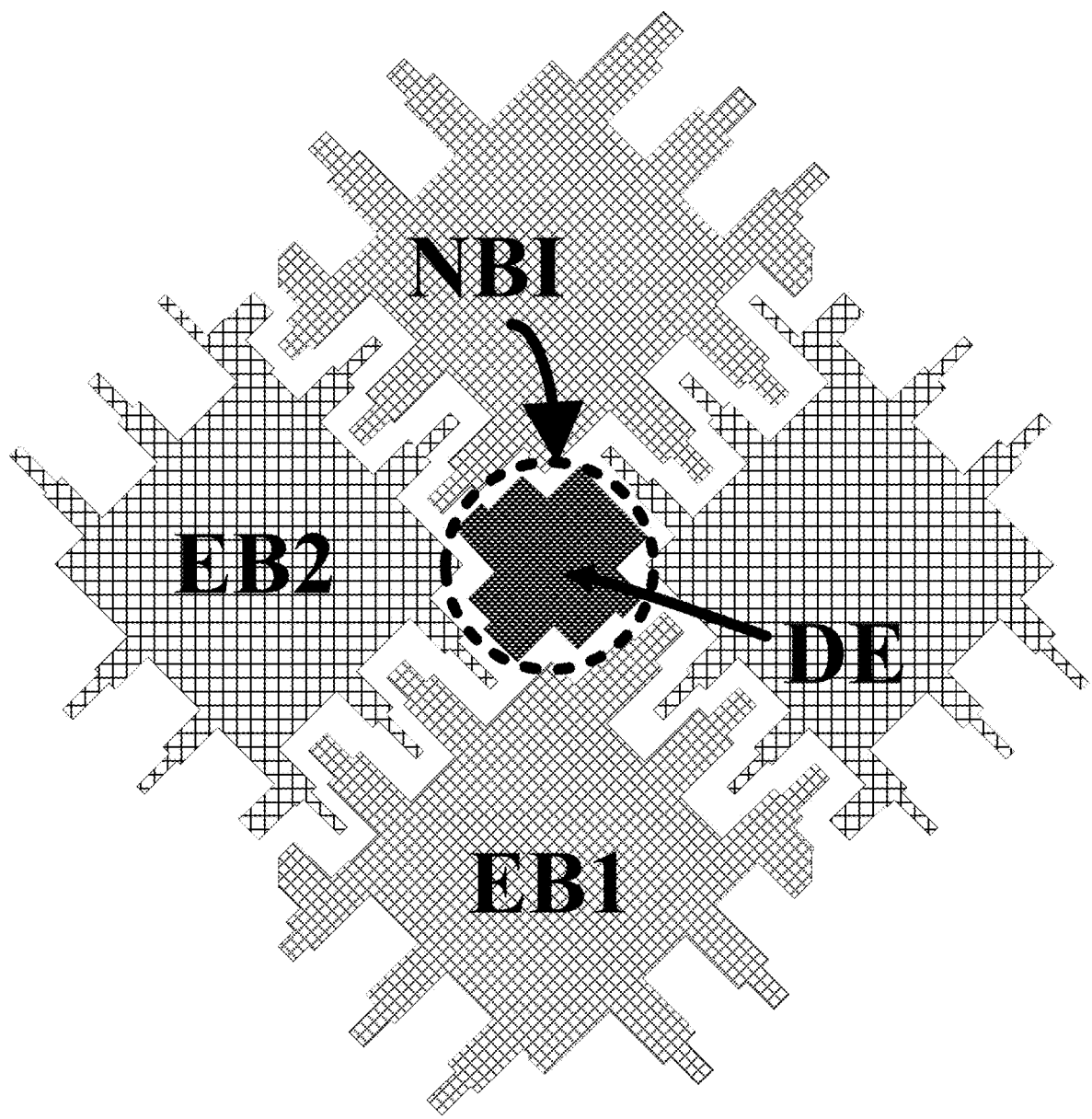
FIG. 16 is a zoom-in view of a region surrounding a non-bridge intersection in FIG. 15.
Figure 17A:
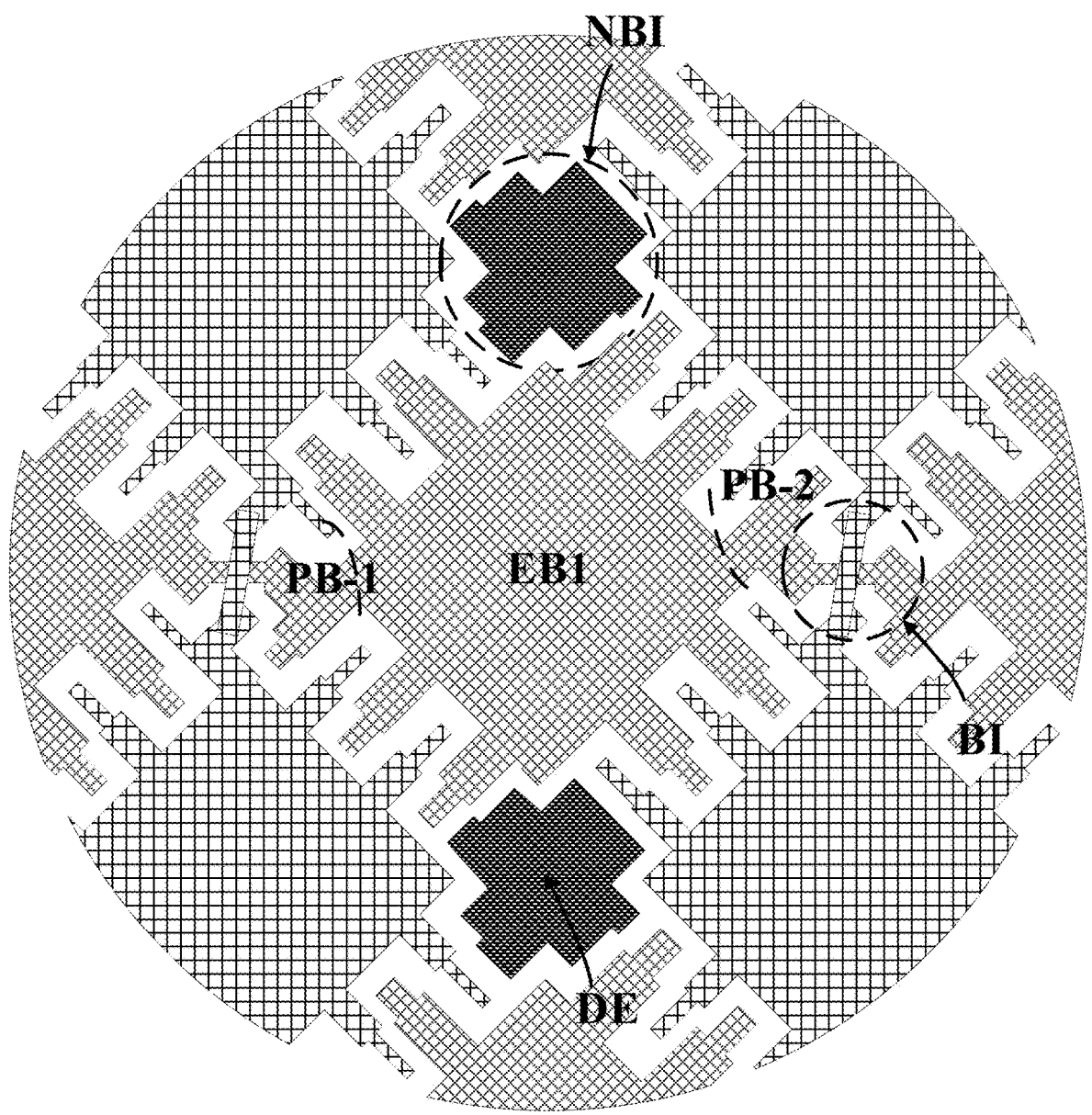
FIG. 17A is a zoom-in view of a region surrounding a first touch electrode block in FIG. 15.
Figure 17B:
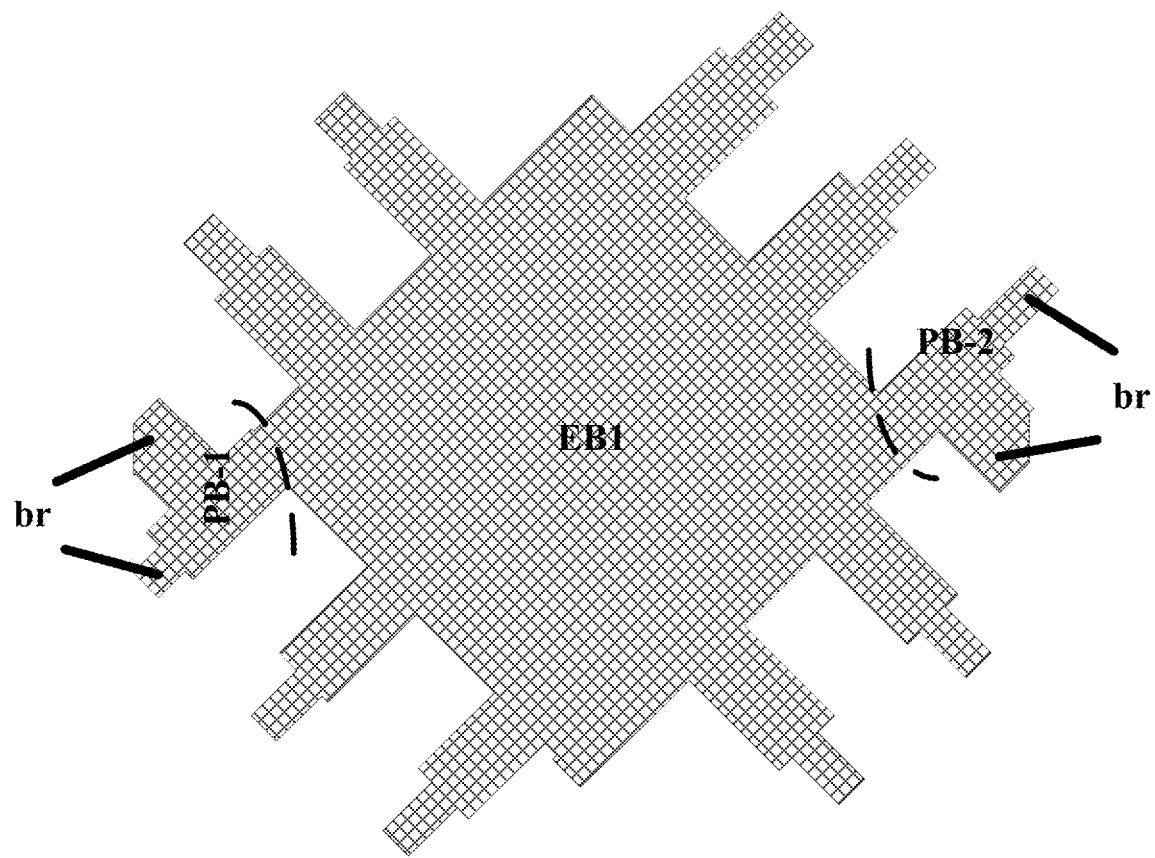
FIG. 17B illustrates the structure of protrusions in the first touch electrode block in FIG. 17A.
Figure 18A:
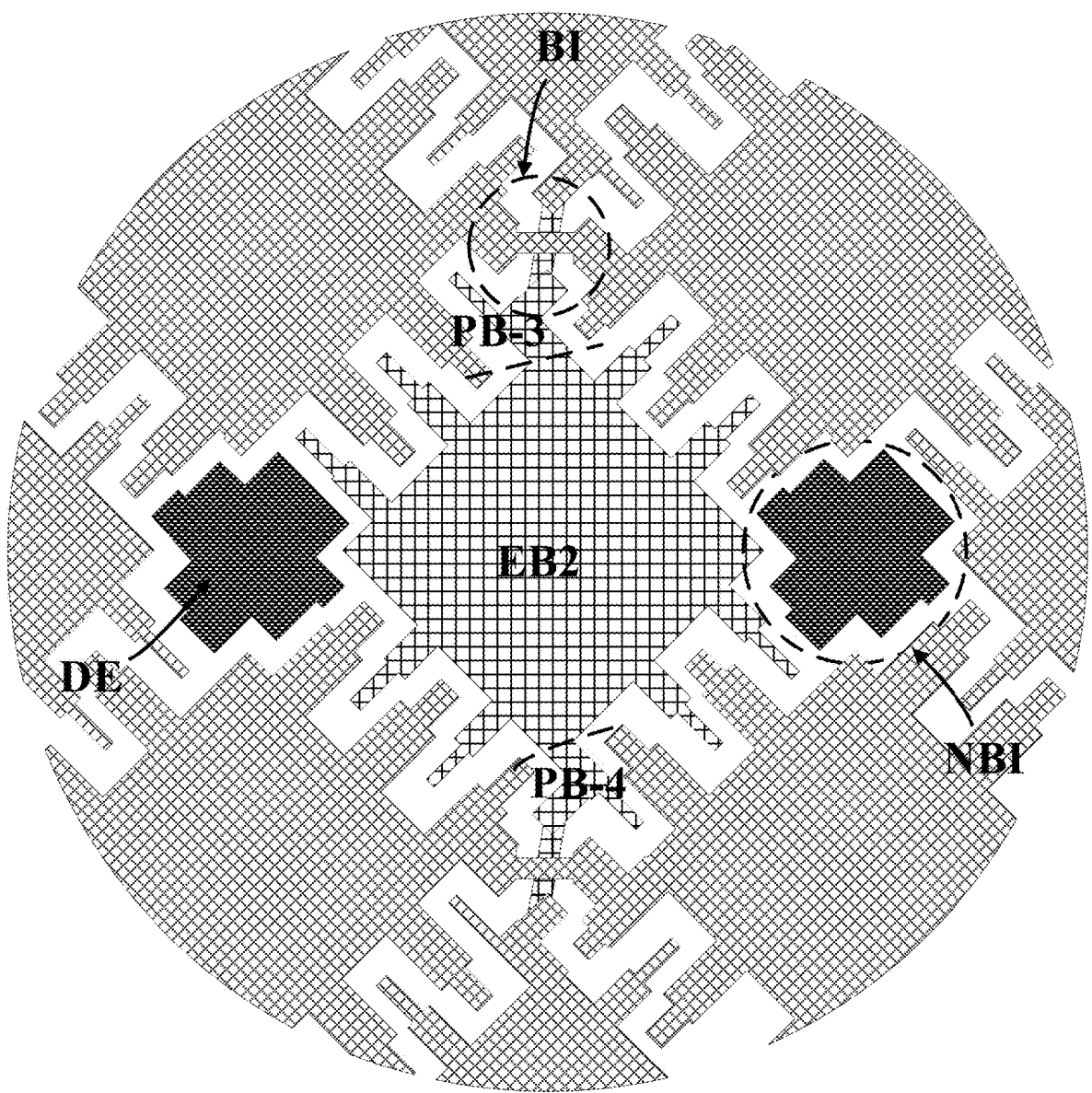
FIG. 18A is a zoom-in view of a region surrounding a second touch electrode block in FIG. 15.
Figure 18B:
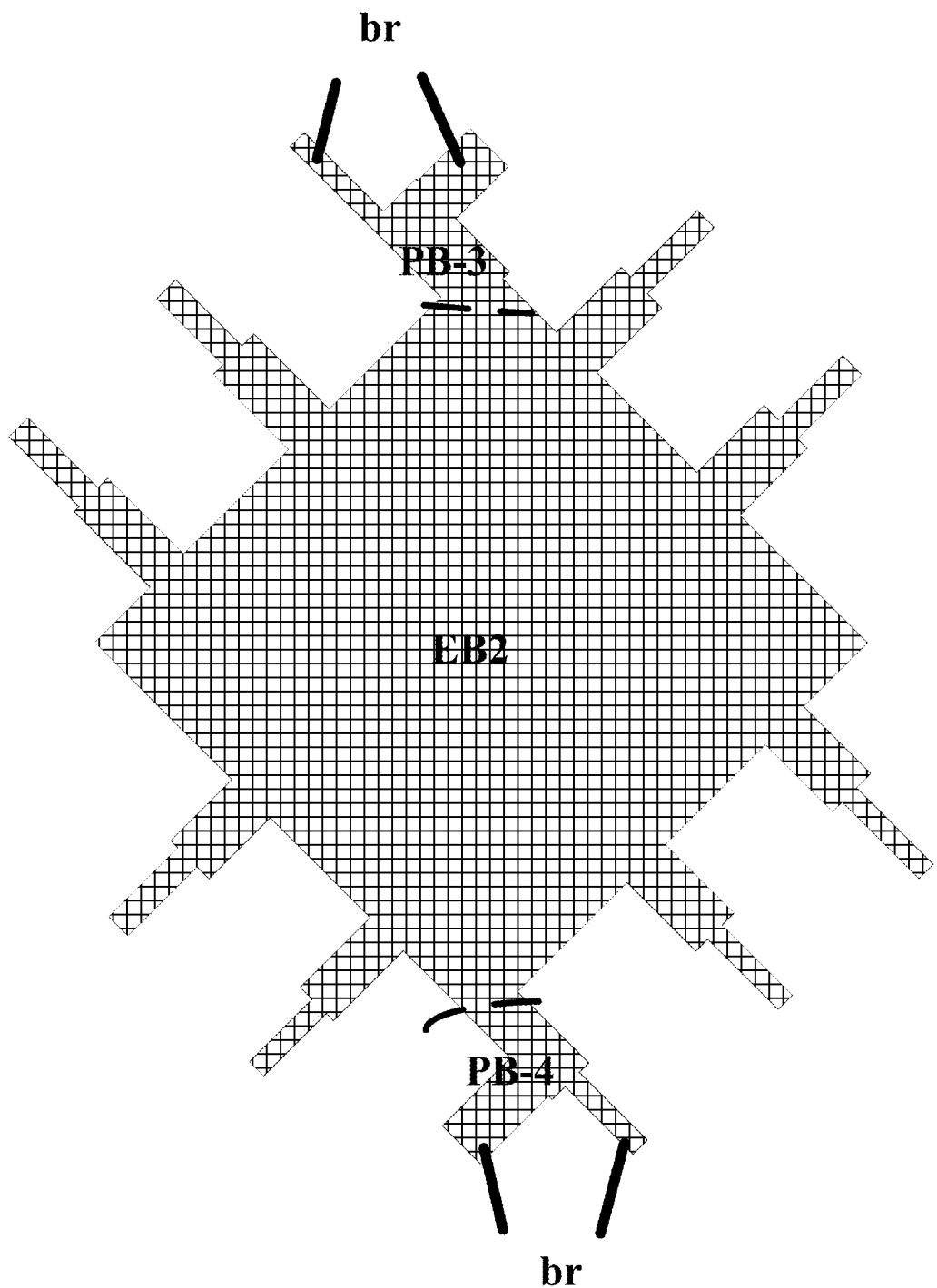
FIG. 18B illustrates the structure of protrusions in the second touch electrode block in FIG. 18A.

In some embodiments, at least one of the two first non-bridge protrusions is fully truncated compared with the two first bridge protrusions. In some embodiments, at least one of the two second non-bridge protrusions is fully truncated compared with the two second bridge protrusions. FIG. 15 is a schematic diagram illustrating the structure of a touch control structure in some embodiments according to the present disclosure. FIG. 16 is a zoom-in view of a region surrounding a non-bridge intersection in FIG. 15. FIG. 17A is a zoom-in view of a region surrounding a first touch electrode block in FIG. 15. FIG. 17B illustrates the structure of protrusions in the first touch electrode block in FIG. 17A. FIG. 18A is a zoom-in view of a region surrounding a second touch electrode block in FIG. 15. FIG. 18B illustrates the structure of protrusions in the second touch electrode block in FIG. 18A. Referring to FIGS. 15, 16, 17A, 17B, 18A, and 18B, the respective one of the plurality of fill patterns DE has an even greater surface area as compared to the respective one of the plurality of fill patterns DE depicted in FIGS. 11, 12, 13A, 13B, 14A, and 14B. To make space for forming the respective one of the plurality of fill patterns DE in FIGS. 15, 16, 17A, 17B, 18A, and 18B, at least one of the protrusions at the respective one of the plurality of non-bridge intersections NBI is fully truncated.

Comparing the first touch electrode block in FIG. 17B with the first touch electrode block in FIG. 7B or FIG. 13B, each of the two first non-bridge protrusions NPB-1 and NPB-2 in FIG. 7B or FIG. 13B is fully truncated. As shown in FIG. 17B, there is no first non-bridge protrusions in the first touch electrode blocks EB1. Comparing the second touch electrode block in FIG. 18B with the second touch electrode block in FIG. 8B or FIG. 14B, each of the two second non-bridge protrusions NPB-3 and NPB-4 in FIG. 8B or FIG. 14B is fully truncated. As shown in FIG. 18B, there is no second non-bridge protrusions in the second touch electrode blocks EB2.

In some embodiments, at least one of the two first non-bridge protrusions is fully truncated compared with the two first bridge protrusions. Referring to FIG. 17A and FIG.

17B, there is no first non-bridge protrusions in the first touch electrode blocks EB1 (being fully truncated).

In some embodiments, at least one of the two second non-bridge protrusions is fully truncated compared with the two second bridge protrusions. Referring to FIG. 18A and FIG. 18B, there is no second non-bridge protrusions in the second touch electrode blocks EB2 (being fully truncated).

TABLE 3

Parameters measured in touch control structures in some embodiments according to the present disclosure.

|  | Touch control structure of FIG. 15 | Touch control structure of FIG. 1 |
|---|---|---|
| Surface area ratio | 3 | 0.4 |
| Cm (pF) | 0.88 | 1.011 |
| Cm' (pF) | 0.829 | 0.957 |
| ΔCm (pF) | 0.051 | 0.054 |
| ΔCm/Cm | 5.8% | 5.33% |
| Cp1 (pF) | 8.88 | 9.77 |
| Cp2 (pF) | 10.3 | 11.15 |
| R1 (Ω) | 25.8 | 25.8 |
| R2 (Ω) | 24.5 | 24.5 |

Table 3 summarizes parameters measured in touch control structures in some embodiments according to the present disclosure. The surface area ratio in the touch control structure of FIG. 1 is 0.4%. The surface area ratio in the touch control structure of FIG. 15 is increased to 3%. With the surface area ratio increased and the protrusions of the touch electrode blocks truncated, the mutual capacitance Cm and Cm' further decrease to lower values (0.88 and 0.829, respectively). Resistance R1 of the first touch electrode blocks and resistance R2 of the second touch electrode blocks are not affected by the increased surface area ratio, and remain substantially the same as those valued in the touch control structure of FIG. 1. However, the capacitance difference ΔCm is adversely affected by having touch electrode blocks with protrusions truncated. A decreased capacitance difference ΔCm adversely affects touch performance of the touch control structure.

In some embodiments, a ratio between a first total surface area of the plurality of intersection fill patterns and a second total combined surface area of the first touch electrode blocks, the second touch electrode blocks, and the plurality of intersection fill patterns is greater than zero and no more than 3%, for example, greater than zero and no more than 2.5%, greater than zero and no more than 2.0%, greater than zero and no more than 1.5%, or greater than zero and no more than 1%.

Figure 19:
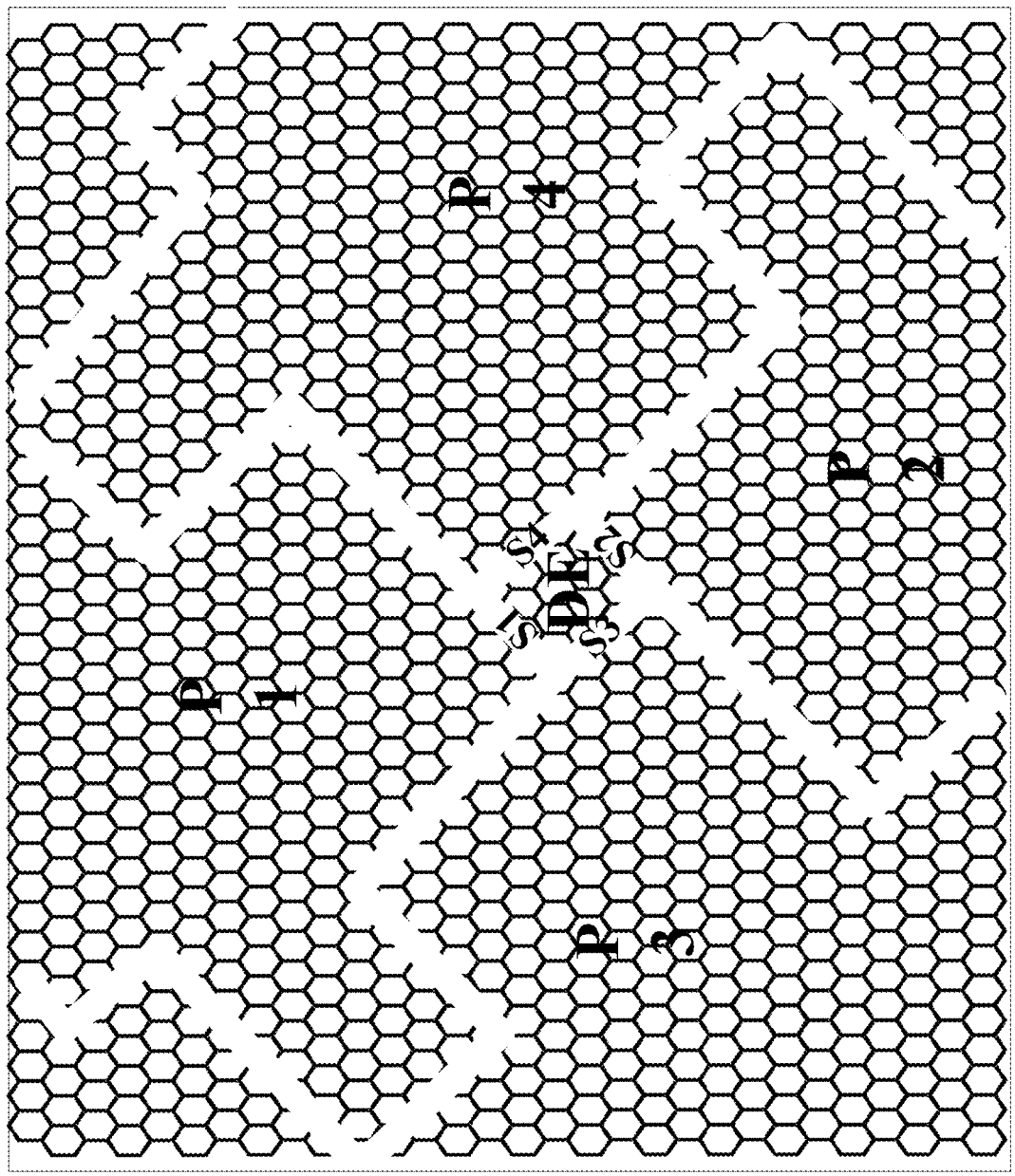
FIG. 19 is a zoom-in view of a region surrounding a non-bridge intersection in some embodiments according to the present disclosure.
Figure 20:
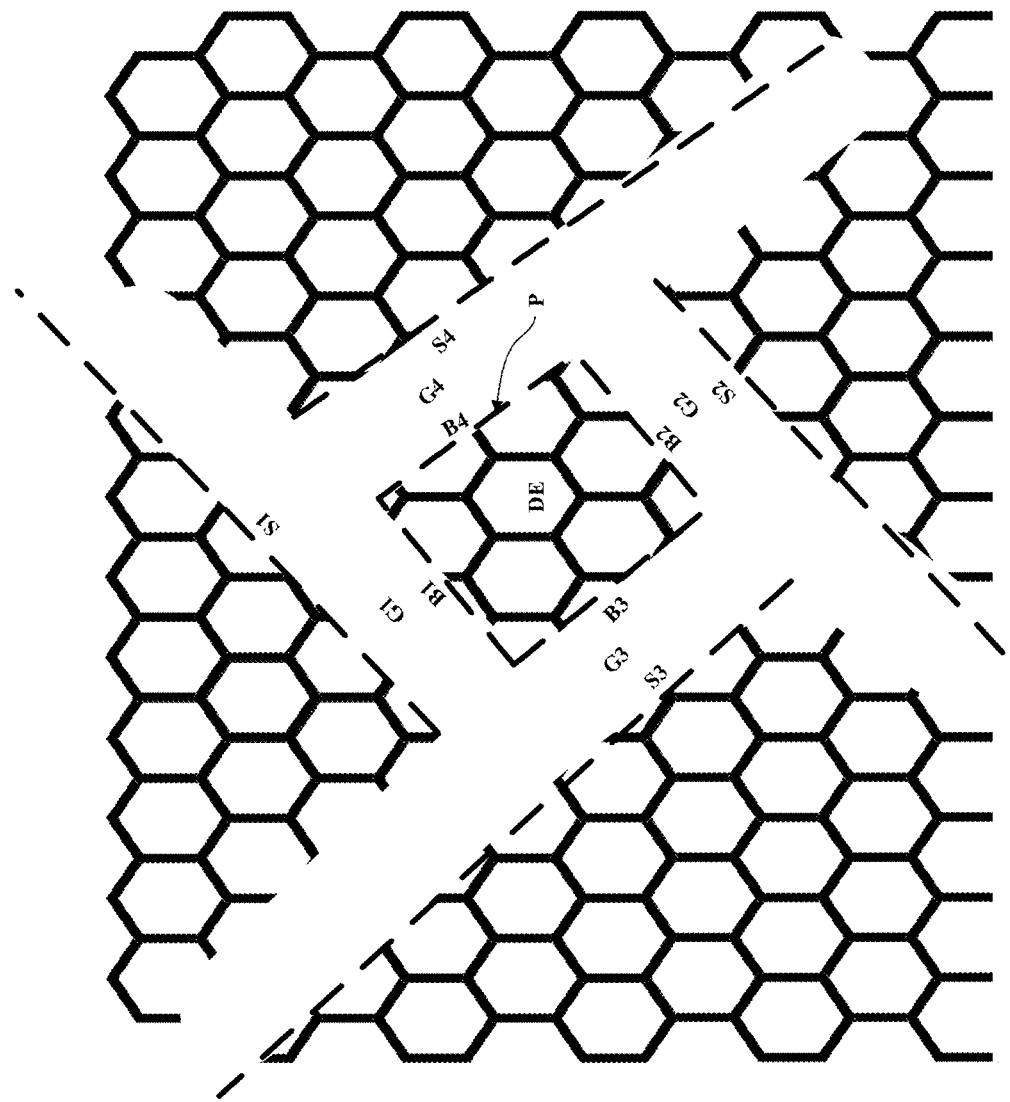
FIG. 20 is further zoom-in view of FIG. 19.

FIG. 19 is a zoom-in view of a region surrounding a non-bridge intersection in some embodiments according to the present disclosure. FIG. 20 is further zoom-in view of FIG. 19. Referring to FIG. 19 and FIG. 20, in some embodiments, an entirety of a periphery P of the respective one of the plurality of intersection fill patterns DE is surrounded by respective portions of a first side S1 of the first portion P1, a second side S2 of the second portion P2, a third side S3 of the third portion P3, and a fourth side S4 of a fourth portion P4. Optionally, the first side S1 and the second side S2 are substantially parallel to each other. Optionally, the third side S3 and the fourth side S4 are substantially parallel to each other.

In some embodiments, electrode blocks of the plurality of first touch electrodes TE1 and the plurality of second touch electrodes TE2 are respectively mesh electrode blocks made of mesh lines. Adjacent electrode blocks of the plurality of first touch electrodes and the plurality of second touch electrodes are insulated from each other by line breaks in mesh lines of the mesh electrode blocks. A respective first electrode block and a respective second electrode block adjacent to each other are insulated from each other by line breaks in mesh lines. As shown in FIG. 19 and FIG. 20, the first portion P1 is insulated from the third portion P3 and from the fourth portion P4 by lines breaks in the mesh lines. Similarly, the second portion P2 is insulated from the third portion P3 and from the fourth portion P4 by lines breaks in the mesh lines; the third portion P3 is insulated from the first portion P1 and the second portion P2 by lines breaks in the mesh lines; and the fourth portion P4 is insulated from the first portion P1 and the second portion P2 by lines breaks in the mesh lines. Optionally, the first side S1, the second side S2, the third side S3, and the fourth side S4, are respectively formed by virtually connected line breaks respectively of the first portion P1, the second portion P2, the third portion P3, and the fourth portion P4.

In some embodiments, the plurality of intersection fill patterns DE are mesh patterns made of mesh lines. The periphery P of the respective one of the plurality of intersection fill patterns DE is insulated from the first portion P1, the second portion P2, the third portion P3, and the fourth portion P4 by line breaks in the mesh lines of the mesh patterns. Optionally, the periphery of the respective one of the plurality of intersection fill patterns DE is formed by line breaks in the mesh lines of the mesh patterns.

Figure 21:
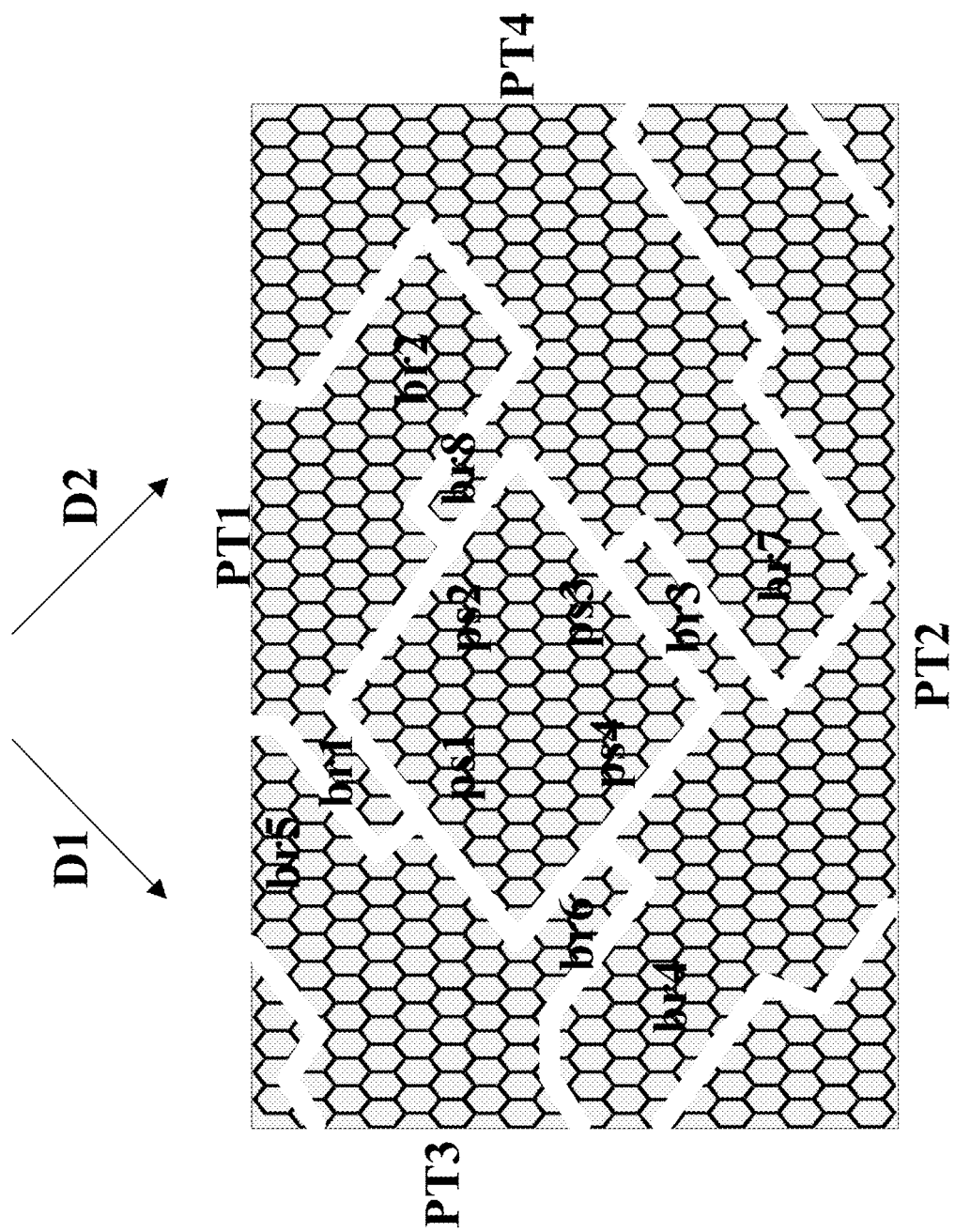
FIG. 21 is a zoom-in view of a region surrounding a non-bridge intersection in some embodiments according to the present disclosure.

In some embodiments, each of the first portion, the second portion, the third portion, and the fourth portion includes a respective protrusion directly adjacent to the respective one of the plurality of intersection fill patterns. In some embodiments, the respective protrusion comprises a first branch and a second branch. Optionally, the first branch extends along a first direction; the second branch extends along a second direction; and the first direction and the second direction are substantially perpendicular to each other. FIG. 21 is a zoom-in view of a region surrounding a non-bridge intersection in some embodiments according to the present disclosure. Referring to FIG. 21, the respective one of the plurality of intersection fill patterns DE is in a space surrounded by a first protrusion PT1, a second protrusion PT2, a third protrusion PT3, and a fourth protrusion PT4. Referring to FIG. 1, FIG. 11, FIG. 15, and FIG. 21, in some embodiments, the first protrusion PT1 is from a first row of the plurality of rows, the second protrusion PT2 is from a second row of the plurality rows, the third protrusion PT3 is from a first column of the plurality of columns, and the fourth protrusion PT4 is from a second column of the plurality of columns. The first row and the second row are adjacent to each other. The first column and the second column are adjacent to each other.

In some embodiments, the first protrusion PT1 includes a first branch br1 and a second branch br2; the second protrusion PT2 includes a third branch br3 and a fourth branch br4; the third protrusion PT3 includes a fifth branch br5 and a sixth branch br6; and the fourth protrusion PT4 includes a seventh branch br7 and an eighth branch br8. Optionally, the first branch br, the third branch br3, the fifth branch br5, the seventh branch br7 respectively extend along a first direction D1. Optionally, the second branch br2, the fourth branch br4, the sixth branch br6, and the eighth branch br8 respectively extend along a second direction D2.

In some embodiments, the electrode blocks of the plurality of first touch electrodes and the plurality of second touch electrodes, and the plurality of intersection fill patterns, are formed from a mesh layer. For example, the electrode blocks of the plurality of first touch electrodes and the plurality of second touch electrodes, and the plurality of intersection fill patterns, are formed by forming a mesh layer on a base substrate, and patterning the mesh layer to form the electrode blocks of the plurality of first touch electrodes and the plurality of second touch electrodes, and the plurality of intersection fill patterns. In some embodiments, the touch control structure so formed in some embodiments includes gaps to respectively space apart the electrode blocks of the plurality of first touch electrodes and the plurality of second touch electrodes, and the plurality of intersection fill patterns. Referring to FIG. 19 and FIG. 20, the touch control structure includes a first gap G1 to space apart a first boundary B1 of the respective one of the plurality of fill patterns DE from the first side S1 of the first portion P1, a second gap G2 to space apart a second boundary B2 of the respective one of the plurality of fill patterns DE from the second side S2 of the second portion P2, a third gap G3 to space apart a third boundary B3 of the respective one of the plurality of fill patterns DE from the third side S3 of the third portion P3, and a fourth gap G4 to space apart a fourth boundary B4 of the respective one of the plurality of fill patterns DE from the fourth side S4 of the fourth portion P4. Optionally, directly adjacent non-bridge protrusion and fill pattern are insulated from each other by a gap having a gap width in a range of 1 μm to 10 μm, e.g., 1 μm to 2 μm, 2 μm to 3 μm, 3 μm to 4 μm, 4 μm to 5 μm, 5 μm to 6 μm, 6 μm to 7 μm, 7 μm to 8 μm, 8 μm to 9 μm, or 9 μm to 10 μm. In one example, the gap width is approximately 5.2 μm. Optionally, the mesh layer has a mesh line width in a range of 1 μm to 5 μm, e.g., 1 μm to 2 μm, 2 μm to 3 μm, 3 μm to 4 μm, or 4 μm to 5 μm. Optionally, the mesh line width is approximately 3 μm.

In some embodiments, the respective one of the plurality of intersection fill patterns DE has a first pattern side ps1, a second pattern side ps2, a third pattern side ps3, and a fourth pattern side ps4. As shown in FIG. 21, in some embodiments, the first pattern side ps1 and the third pattern side ps3 respectively extend along the first direction D1; and the second pattern side ps2 and the fourth pattern side ps4 respectively extend along the second direction D2. Optionally, the first pattern side ps1 is directly adjacent to the first branch br1 and the fifth branch br5; the second pattern side ps2 is directly adjacent to the second branch br2 and the eighth branch br8; the third pattern side ps3 is directly adjacent to the third branch br3 and the seventh branch br7; and the fourth pattern side ps4 is directly adjacent to the fourth branch br4 and the sixth branch br6.

In some embodiments, an average width of the first branch br1 along the second direction D2 is ⅙ to ⅔ (e.g., ⅓ to ⅗) of an average width of the second branch br2 along the first direction D1; an average width of the third branch br3 along the second direction D2 is ⅙ to ⅔ (e.g., ⅓ to ⅗) of an average width of the fourth branch br4 along the first direction D1; an average width of the sixth branch br6 along the first direction D1 is ⅙ to ⅔ (e.g., ⅓ to ⅗) of an average width of the fifth branch br5 along the second direction D2; and an average width of the eighth branch br8 along the first direction is ⅙ to ⅔ (e.g., ⅓ to ⅗) of an average width of the seventh branch br7 along the second direction D2.

In another aspect, the present disclosure provides a display panel including the touch control structure described herein or fabricated by a method described herein, a plurality of display elements, and a plurality of thin film transistors for driving the plurality of display elements. Optionally, the display elements includes a plurality of light emitting diodes, for example, in an organic light emitting diode display panel. Optionally, the display elements include a liquid crystal layer in a plurality of subpixels, for example, in a liquid crystal display panel.

Figure 22A:
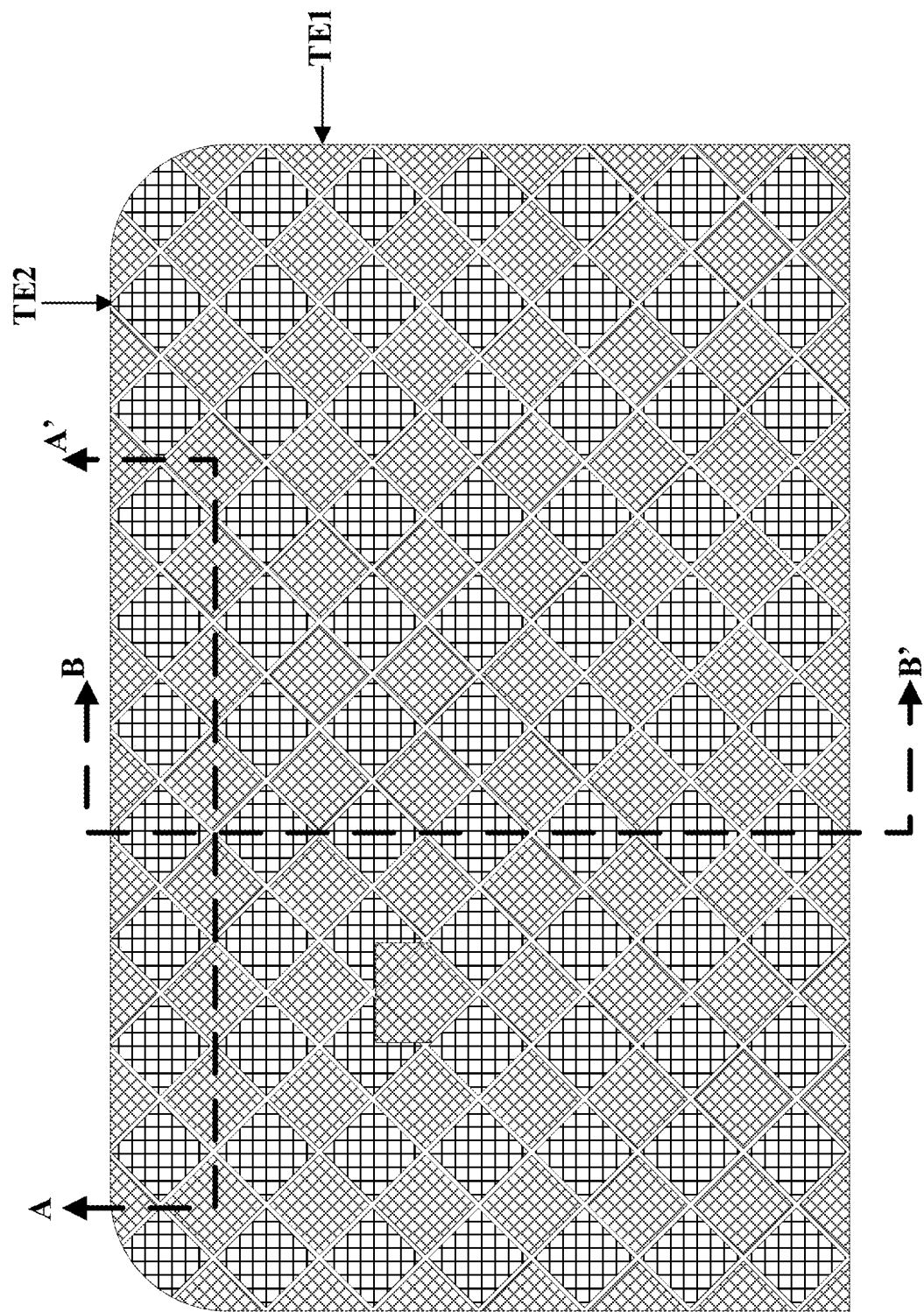
FIG. 22A is a plan view of a display panel in some embodiments according to the present disclosure.
Figure 22B:
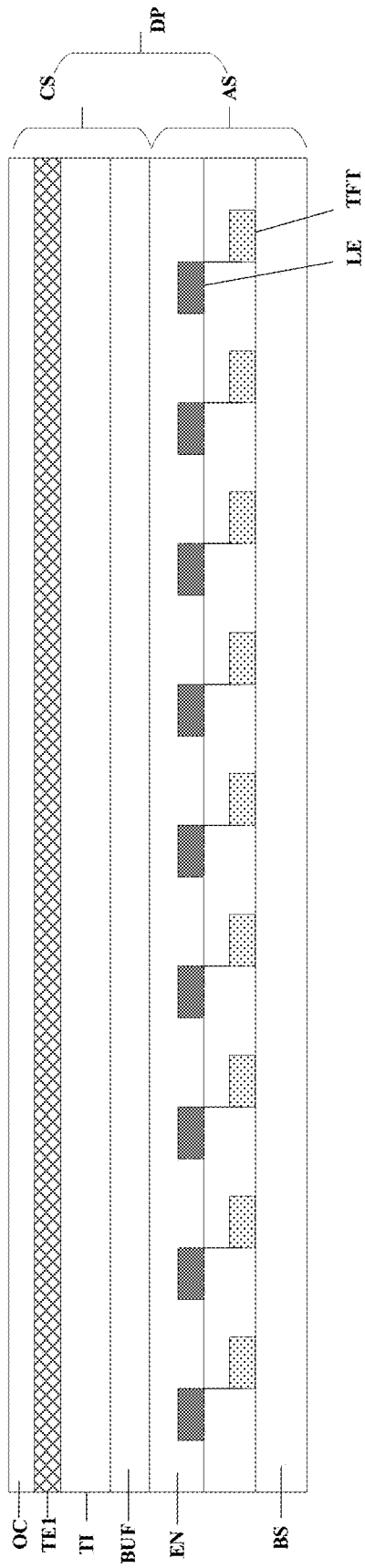
FIG. 22B is a cross-sectional view along an A-A' line in FIG. 22A.
Figure 22C:
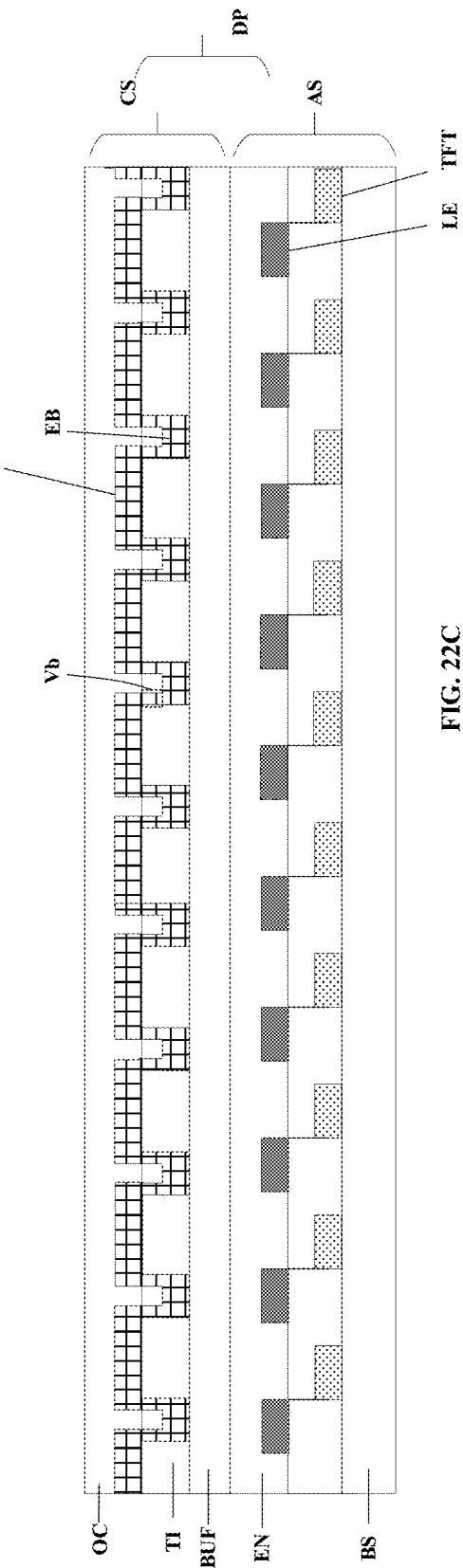
FIG. 22C is a cross-sectional view along a B-B' line in FIG. 22A.

FIG. 22A is a plan view of a display panel in some embodiments according to the present disclosure. FIG. 22B is a cross-sectional view along an A-A' line in FIG. 22A. FIG. 22C is a cross-sectional view along a B-B' line in FIG. 22A. Referring to FIGS. 22A to 22C, the display panel in some embodiments includes an array substrate AS and a counter substrate CS assembled together. In some embodiments, the display panel includes display elements and thin film transistors. Optionally, the display elements includes a plurality of light emitting diodes, for example, in an organic light emitting diode display panel. Optionally, the display elements include a liquid crystal layer in a plurality of subpixels, for example, in a liquid crystal display panel. Referring to FIGS. 22B to 22C, in some embodiments, the array substrate AS includes a base substrate BS, a plurality of thin film transistors TFT on the base substrate BS, and a plurality of light emitting elements LE on the base substrate BS and respectively connected to the plurality of thin film transistors TFT.

In some embodiments, the array substrate AS further includes an encapsulating layer EN encapsulating the plurality of light emitting elements LE. In some embodiments, the counter substrate CS includes a buffer layer BUF and a touch insulating layer TI on the buffer layer BUF. The touch control structure further includes a plurality of touch electrode bridges EB. The touch insulating layer TI is between the plurality of touch electrode bridges EB, and the electrode blocks of the plurality of first touch electrodes TE1 and the plurality of second touch electrodes TE2. The plurality of touch electrode bridges EB respectively extend through vias Vb in the touch insulating layer TI to respectively connect adjacent second electrode blocks in a respective column of the plurality of column of the plurality of second touch electrodes TE2.

Figure 23:
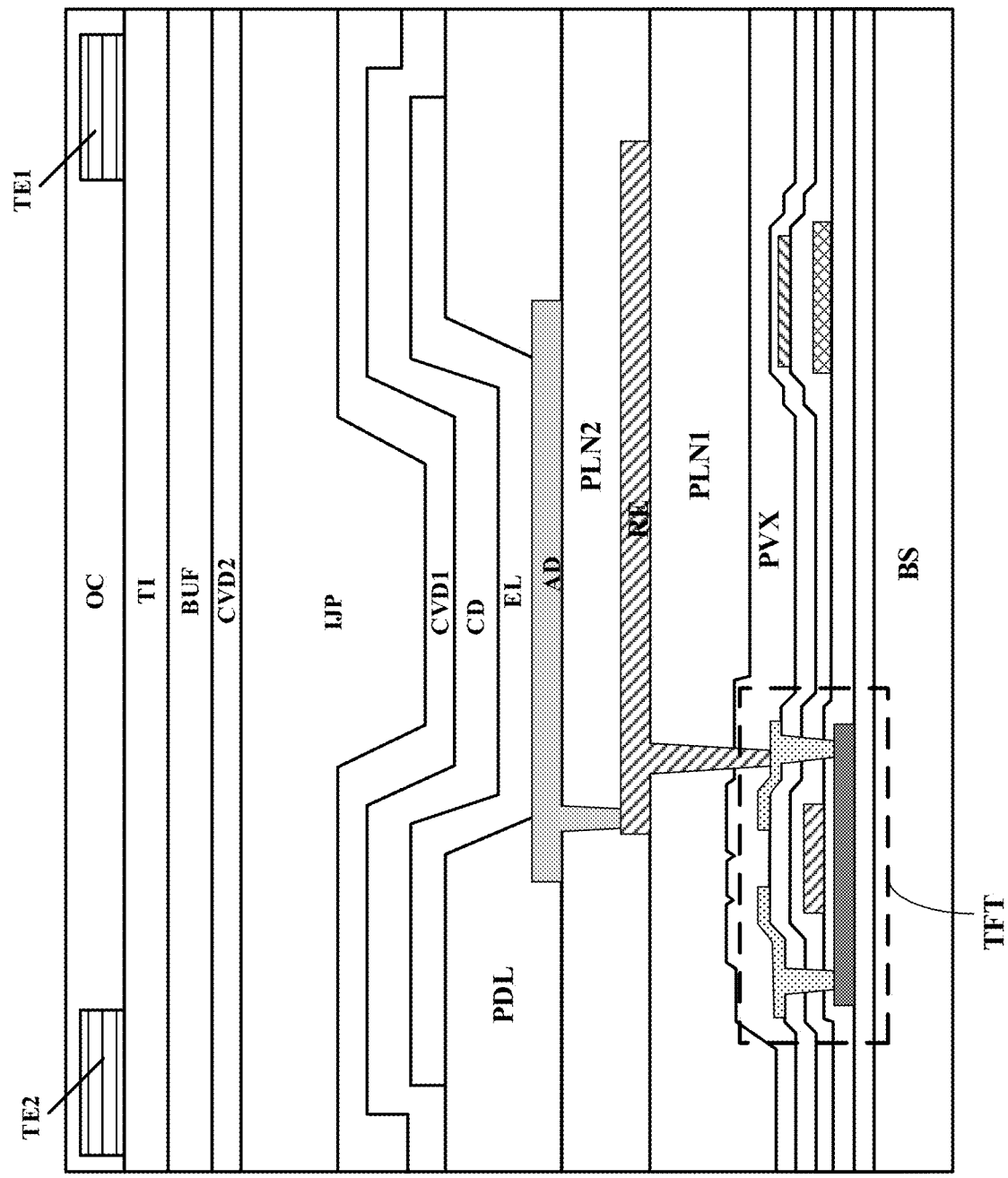
FIG. 23 is a cross sectional view of a display panel in some embodiments according to the present disclosure.

FIG. 23 is a cross sectional view of a display panel in some embodiments according to the present disclosure. Referring to FIG. 23, in the display region, the display panel includes a base substrate BS, a plurality of thin film transistors TFT on the base substrate BS, a passivation layer PVX on a side of the plurality of thin film transistors TFT away from the base substrate BS, a first planarization layer PLN1 on side of the passivation layer PVX away from the base substrate BS, a relay electrode RE on side of the first planarization layer PLN1 away from the passivation layer PVX, a second planarization layer PLN2 on a side of the relay electrode RE away from the first planarization layer PLN1, a pixel definition layer PDL on a side of the second planarization layer PLN2 away from the first planarization layer PLN1 and defining subpixel apertures, an anode AD on a side of the second planarization layer PLN2 away from the first planarization layer PLN1, a light emitting layer EL on a side of the anode AD away from the second planarization layer PLN2, a cathode CD on a side of the light emitting layer EL away from the anode AD, a first inorganic encapsulating layer CVD1 on a side of the cathode CD away from light emitting layer EL, an organic encapsulating layer IJP on a side of the first inorganic encapsulating layer CVD1 away from the cathode CD, a second inorganic encapsulating layer CVD2 on a side of the organic encapsulating layer IJP away from the first inorganic encapsulating layer CVD1, a buffer layer BUF on a side of the second inorganic encapsulating layer CVD2 away from the organic encapsulating layer IJP, a touch insulating layer TI on a side of the buffer layer BUF away from the second inorganic encapsulating layer CVD2, touch electrodes (e.g., the plurality of first touch electrodes TE1 and the plurality of second touch electrodes TE2 as shown in FIG. 23) on a side of the touch insulating layer TI away from the buffer layer BUF, and an overcoat layer OC on a side of the touch electrodes away from the touch insulating layer TI.

In another aspect, the present disclosure provides a display apparatus including a display panel described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

In another aspect, the present disclosure provides a method of fabricating a touch control structure. In some embodiments, the method includes forming a plurality of first touch electrodes arranged in a plurality of rows and a plurality of second touch electrodes arranged in a plurality of columns. First touch electrode blocks of the plurality of rows and second touch electrode blocks of the plurality of columns are respectively arranged in interlaced matrices, forming a plurality of bridge intersections and a plurality of non-bridge intersections. Optionally, the method further includes, at a respective one of the plurality of bridge intersections, forming a respective one of a plurality of first bridges connecting two adjacent first touch electrode blocks in a respective row and a respective one of a plurality of second bridges connecting two adjacent second touch electrode blocks in a respective column. Optionally, the method further includes, at a respective one of the plurality of non-bridge intersections, forming a respective one of a plurality of intersection fill patterns spaced apart from the first touch electrode blocks and the second touch electrode blocks.

Optionally, the respective one of the plurality of intersection fill patterns is formed in a space surrounded by two first touch electrode blocks respectively from two adjacent rows of the plurality of rows and two second touch electrode blocks respectively from two adjacent columns of the plurality of columns.

Optionally, the two first touch electrode blocks respectively from the two adjacent rows are spaced apart from each other by the respective one of the plurality of intersection fill patterns; and the two second touch electrode blocks respectively from the two adjacent columns are spaced apart from each other by the respective one of the plurality of intersection fill patterns.

Optionally, a first virtual center line of the two first touch electrode blocks respectively from the two adjacent rows crosses over the respective one of the plurality of intersection fill patterns; and a second virtual center line of the two second touch electrode blocks respectively from the two adjacent columns of the plurality of columns crosses over the respective one of the plurality of intersection fill patterns.

Optionally, the plurality of bridge intersections and the plurality of non-bridge intersections are arranged in interlaced matrices.

In some embodiments, the respective one of the plurality of intersection fill patterns is formed in a space surrounded by a first portion, a second portion, a third portion, and a fourth portion. Optionally, the first portion and the second portion are respectively from the first touch electrode blocks respectively from two adjacent rows of the plurality of rows.

Optionally, the third portion and the fourth portion are respectively from the two second touch electrode blocks respectively from two adjacent columns of the plurality of columns. Optionally, the first portion is respectively spaced apart from the second portion, the third portion, and the fourth portion by the respective one of the plurality of intersection fill patterns. Optionally, the second portion is respectively spaced apart from the first portion, the third portion, and the fourth portion by the respective one of the plurality of intersection fill patterns. Optionally, the third portion is respectively spaced apart from the first portion, the second portion, and the fourth portion by the respective one of the plurality of intersection fill patterns. Optionally, the fourth portion is respectively spaced apart from the first portion, the second portion, and the third portion by the respective one of the plurality of intersection fill patterns Optionally, each of the first portion, the second portion, the third portion, and the fourth portion includes a respective protrusion directly adjacent to the respective one of the plurality of intersection fill patterns.

In some embodiments, forming a respective first block of the first touch electrode blocks includes forming two first bridge protrusions along a row direction and two first non-bridge protrusions along a column direction. Optionally, the two first bridge protrusions are respectively connected to two adjacent first touch electrode blocks respectively through two adjacent bridge intersections of the plurality of bridge intersections along the row direction. Optionally, the two first non-bridge protrusions are respectively directly adjacent to two adjacent fill patterns of the plurality of intersection fill patterns respectively at two adjacent non-bridge intersections of the plurality of non-bridge intersections along the column direction.

Optionally, the two first non-bridge protrusions are substantially intact compared with the two first bridge protrusions.

Optionally, the two first non-bridge protrusions are at least partially truncated compared with the two first bridge protrusions.

Optionally, each of the two first bridge protrusions has a first number of branches; each of the two first non-bridge protrusions has a second number of branches; and the first number of branches equals to the second number of branches.

Optionally, each of the two first non-bridge protrusions includes two branches; a first respective one of the plurality of intersection fill patterns is directly adjacent to two branches of a first respective one of the two first non-bridge protrusions; and a second respective one of the plurality of intersection fill patterns is directly adjacent to two branches of a second respective one of the two first non-bridge protrusions.

In some embodiments, forming a respective second block of the second touch electrode blocks includes forming two second bridge protrusions along a column direction and two second non-bridge protrusions along a row direction. Optionally, the two second bridge protrusions are respectively connected to two adjacent second touch electrode blocks respectively through two adjacent bridge intersections of the plurality of bridge intersections along the column direction. Optionally, the two second non-bridge protrusions are respectively directly adjacent to two adjacent fill patterns of the plurality of intersection fill patterns respectively at two adjacent non-bridge intersections of the plurality of non-bridge intersections along the row direction.

Optionally, the two second non-bridge protrusions are substantially intact compared with the two second bridge protrusions.

Optionally, the two second non-bridge protrusions are at least partially truncated compared with the two second bridge protrusions.

Optionally, each of the two second bridge protrusions has a third number of branches; each of the two second non-bridge protrusions has a fourth number of branches; and the third number of branches equals to the fourth number of branches.

Optionally, each of the two second non-bridge protrusions includes two branches; a third respective one of the plurality of intersection fill patterns is directly adjacent to two branches of a third respective one of the two second non-bridge protrusions; and a fourth respective one of the plurality of intersection fill patterns is directly adjacent to two branches of a fourth respective one of the two second non-bridge protrusions.

Optionally, a ratio between a first total surface area of the plurality of intersection fill patterns and a second total combined surface area of the first touch electrode blocks, the second touch electrode blocks, and the plurality of intersection fill patterns is greater than zero and no more than 1%.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a plurality of first touch electrodes arranged in a plurality of rows and a plurality of second touch electrodes arranged in a plurality of columns;

first touch electrode blocks of the plurality of rows and second touch electrode blocks of the plurality of columns are respectively arranged in interlaced matrices, forming a plurality of bridge intersections and a plurality of non-bridge intersections;

the touch control structure at a respective one of the plurality of bridge intersections comprises a respective one of a plurality of first bridges connecting two adjacent first touch electrode blocks in a respective row and a respective one of a plurality of second bridges connecting two adjacent second touch electrode blocks in a respective column; and the touch control structure at a respective one of the plurality of non-bridge intersections comprises a respective one of a plurality of intersection fill patterns spaced apart from the first touch electrode blocks and the second touch electrode blocks;

wherein the respective one of the plurality of intersection fill patterns is in a space surrounded by a first portion, a second portion, a third portion, and a fourth portion;

the first portion and the second portion are respectively from the first touch electrode blocks respectively from two adjacent rows of the plurality of rows;

the third portion and the fourth portion are respectively from the two second touch electrode blocks respectively from two adjacent columns of the plurality of columns;

an entirety of a periphery of the respective one of the plurality of intersection fill patterns is surrounded by respective portions of a first side of the first portion, a second side of the second portion, a third side of the third portion, and a fourth side of a fourth portion; and the first touch electrode blocks, the second touch electrode blocks, and the plurality of intersection fill patterns are in a same layer and made of a same material.

2. The touch control structure of claim 1, wherein the respective one of the plurality of intersection fill patterns is in a space surrounded by two first touch electrode blocks respectively from two adjacent rows of the plurality of rows and two second touch electrode blocks respectively from two adjacent columns of the plurality of columns.

3. The touch control structure of claim 2, wherein the two first touch electrode blocks respectively from the two adjacent rows are spaced apart from each other by the respective one of the plurality of intersection fill patterns; and the two second touch electrode blocks respectively from the two adjacent columns are spaced apart from each other by the respective one of the plurality of intersection fill patterns.

4. The touch control structure of claim 2, wherein a first virtual center line of the two first touch electrode blocks respectively from the two adjacent rows crosses over the respective one of the plurality of intersection fill patterns; and a second virtual center line of the two second touch electrode blocks respectively from the two adjacent columns of the plurality of columns crosses over the respective one of the plurality of intersection fill patterns.

5. The touch control structure of claim 1, wherein the first portion is respectively spaced apart from the second portion, the third portion, and the fourth portion by the respective one of the plurality of intersection fill patterns;

the second portion is respectively spaced apart from the first portion, the third portion, and the fourth portion by the respective one of the plurality of intersection fill patterns;

the third portion is respectively spaced apart from the first portion, the second portion, and the fourth portion by the respective one of the plurality of intersection fill patterns; and the fourth portion is respectively spaced apart from the first portion, the second portion, and the third portion by the respective one of the plurality of intersection fill patterns.

6. The touch control structure of claim 1, wherein the first side and the second side are substantially parallel to each other; and the third side and the fourth side are substantially parallel to each other.

7. The touch control structure of claim 1, wherein electrode blocks of the plurality of first touch electrodes and the plurality of second touch electrodes are respectively mesh electrode blocks;

the plurality of intersection fill patterns are mesh patterns;

a respective first electrode block and a respective second electrode block adjacent to each other are insulated from each other by line breaks in mesh lines of the mesh electrode blocks;

the first side, the second side, the third side, and the fourth side, are respectively formed by virtually connected line breaks respectively of the first portion, the second portion, the third portion, and the fourth portion;

the periphery of the respective one of the plurality of intersection fill patterns is insulated from the first portion, the second portion, the third portion, and the fourth portion by line breaks in the mesh lines of the mesh patterns; and the periphery of the respective one of the plurality of intersection fill patterns is formed by the line breaks in the mesh lines of the mesh patterns.

8. The touch control structure of claim 1, wherein each of the first portion, the second portion, the third portion, and the fourth portion comprises a respective protrusion adjacent to the respective one of the plurality of intersection fill patterns;

wherein the respective protrusion comprises a first branch and a second branch;

the first branch extends along a first direction;

the second branch extends along a second direction; and the first direction and the second direction are substantially perpendicular to each other.

9. The touch control structure of claim 1, wherein a respective second block of the second touch electrode blocks comprises two second bridge protrusions along a column direction and two second non-bridge protrusions along a row direction;

the two second bridge protrusions are respectively connected to two adjacent second touch electrode blocks respectively through two adjacent bridge intersections of the plurality of bridge intersections along the column direction; and the two second non-bridge protrusions are respectively directly adjacent to two adjacent fill patterns of the plurality of intersection fill patterns respectively at two adjacent non-bridge intersections of the plurality of non-bridge intersections along the row direction.

10. The touch control structure of claim 1, wherein a ratio between a first total surface area of the plurality of intersection fill patterns and a second total combined surface area of the first touch electrode blocks, the second touch electrode blocks, and the plurality of intersection fill patterns is greater than zero and no more than 1%.

11. The touch control structure of claim 1, further comprising a plurality of touch electrode bridges and an insulating layer between the plurality of touch electrode bridges, and the electrode blocks of the plurality of first touch electrodes and the plurality of second touch electrodes;

wherein the plurality of touch electrode bridges respectively extend through vias in the insulating layer to respectively connect adjacent second electrode blocks in a respective column of the plurality of columns of the plurality of second touch electrodes.

12. The touch control structure of claim 1, further comprising a plurality of internal fill patterns respectively surrounded by electrode blocks of the plurality of second touch electrodes;

wherein the plurality of internal fill patterns are absent in the plurality of first touch electrodes.

13. A display apparatus, comprising a display panel, and an integrated circuit connected to the display panel;

wherein the display panel comprises the touch control structure of claim 1, and a plurality of display elements.

* * * * *